US010120558B2

(12) United States Patent
Yang et al.

(10) Patent No.: US 10,120,558 B2
(45) Date of Patent: Nov. 6, 2018

(54) MOBILE TERMINAL AND METHOD OF CONTROLLING CONTENT THEREOF

(71) Applicant: LG ELECTRONICS INC., Seoul (KR)

(72) Inventors: Yoonseok Yang, Seoul (KR); Eunsoo Jung, Seoul (KR); Juha Hyun, Seoul (KR); Shinnyue Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 331 days.

(21) Appl. No.: 14/874,096

(22) Filed: Oct. 2, 2015

(65) Prior Publication Data

US 2016/0179328 A1  Jun. 23, 2016

(30) Foreign Application Priority Data

Dec. 23, 2014  (KR) ........................ 10-2014-0187423

(51) Int. Cl.
| | |
|---|---|
| *G06F 3/0488* | (2013.01) |
| *H04M 1/673* | (2006.01) |
| *G06F 3/0485* | (2013.01) |
| *G06F 3/0484* | (2013.01) |
| *G06F 1/16* | (2006.01) |

(52) U.S. Cl.
CPC .......... *G06F 3/0488* (2013.01); *G06F 3/0485* (2013.01); *G06F 3/04842* (2013.01); *H04M 1/673* (2013.01); *G06F 1/1626* (2013.01); *G06F 2200/1636* (2013.01); *G06F 2203/04101* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0001763 | A1* | 1/2006 | Takemoto | H04N 5/23212 348/345 |
| 2009/0228841 | A1* | 9/2009 | Hildreth | G06F 3/0304 715/863 |
| 2011/0035691 | A1* | 2/2011 | Kim | G06F 3/04817 715/765 |
| 2011/0298732 | A1 | 12/2011 | Yoshimoto et al. | |
| 2012/0046077 | A1* | 2/2012 | Kim | H04M 1/72577 455/566 |
| 2012/0054670 | A1 | 3/2012 | Rainisto | |

(Continued)

FOREIGN PATENT DOCUMENTS

| | | |
|---|---|---|
| EP | 2107443 A2 | 10/2009 |
| EP | 2148497 A1 | 1/2010 |
| EP | 2624116 A1 | 8/2013 |

*Primary Examiner* — Hien L Duong
(74) *Attorney, Agent, or Firm* — Birch, Stewart, Kolasch & Birch, LLP

(57) ABSTRACT

A method for controlling a mobile terminal, and which includes displaying content on a front display unit of the mobile terminal; sensing a touch gesture applied to a distance detecting sensor on a rear input unit of the mobile terminal; measuring, via a controller of the mobile terminal, a spaced distance of a finger, taken away from the distance detecting sensor after inputting the touch gesture; and controlling, via the controller, an operation of the content displayed on the front display unit according to the sensed touch gesture and the measured spaced distance.

18 Claims, 28 Drawing Sheets

(56) References Cited

U.S. PATENT DOCUMENTS

| | | | |
|---|---|---|---|
| 2012/0154292 A1 | 6/2012 | Zhao et al. | |
| 2013/0053105 A1* | 2/2013 | Lee | H04M 1/673 455/565 |
| 2013/0227455 A1* | 8/2013 | Lee | G06F 17/30274 715/769 |
| 2013/0227456 A1* | 8/2013 | Lee | G06F 17/30265 715/769 |
| 2013/0227471 A1* | 8/2013 | Cha | G06F 3/0488 715/790 |
| 2013/0293490 A1* | 11/2013 | Ward | G06F 3/0488 345/173 |
| 2014/0028572 A1* | 1/2014 | St. Clair | G06F 3/0488 345/173 |
| 2014/0132542 A1* | 5/2014 | Lipman | G06F 3/0488 345/173 |
| 2014/0191998 A1* | 7/2014 | Chuang | G06F 3/017 345/173 |
| 2014/0267094 A1* | 9/2014 | Hwang | G06F 3/0488 345/173 |
| 2014/0267130 A1* | 9/2014 | Hwang | G06F 3/0488 345/174 |
| 2014/0340338 A1* | 11/2014 | Kim | G06F 3/0488 345/173 |
| 2014/0354567 A1* | 12/2014 | Park | G06F 3/0488 345/173 |
| 2015/0007024 A1* | 1/2015 | Jeong | G06F 17/211 715/277 |
| 2015/0024728 A1* | 1/2015 | Jang | H04M 1/72519 455/418 |
| 2015/0042580 A1* | 2/2015 | Shim | G06F 3/017 345/173 |
| 2015/0084855 A1* | 3/2015 | Song | G06F 3/017 345/156 |
| 2015/0126246 A1* | 5/2015 | Lombardi | G06F 3/041 455/556.1 |
| 2015/0229849 A1* | 8/2015 | Shin | H04N 1/00307 348/207.1 |
| 2015/0277581 A1* | 10/2015 | Coombs | G06F 3/0487 345/156 |
| 2015/0286281 A1* | 10/2015 | Fang | G06F 3/017 715/863 |
| 2016/0124514 A1* | 5/2016 | Cha | G06F 3/017 715/767 |
| 2016/0227010 A1* | 8/2016 | Jung | G06F 3/14 |
| 2016/0266652 A1* | 9/2016 | Son | G06F 3/01 |

* cited by examiner

[LDAF KNOCK ON & TOUCH DOWN PUSH (CAPTURE CURRENT SCREEN)]

[SAVE CAPTURED SCREEN]

[OUTPUT FIRST LOCK SCREEN]

[OUTPUT SECOND LOCK SCREEN]

[OUTPUT THIRD LOCK SCREEN]

[KNOCK ON + TOUCH UP HOLD]    [CAPTURE & SAVE CURRENT SCREEN]

[OUTPUT FIRST LOCK SCREEN]

[OUTPUT SECOND LOCK SCREEN]

[OUTPUT THIRD LOCK SCREEN]

MOBILE TERMINAL AND METHOD OF CONTROLLING CONTENT THEREOF

CROSS-REFERENCE TO RELATED APPLICATION

Pursuant to 35 U.S.C. § 119(a), this application claims the benefit of earlier filing date and right of priority to Korean Application No. 10-2014-0187423, filed on Dec. 23, 2014, the contents of which is incorporated by reference herein in its entirety.

BACKGROUND OF THE INVENTION

1. Field of the Invention

This specification relates to a mobile terminal capable of controlling an operation of content displayed on a front surface according to a spaced distance between a laser detection auto focus (LDAF) sensor and a finger, and a method of controlling content thereof.

2. Background of the Invention

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

In general, an auto focus (AF) function is used to capture a subject using a camera. The AF function essentially needs a distance measurement from the camera to the subject. The distance measurement from the subject may be performed by a method using infrared rays or supersonic waves and a through-the-lens (TTL) method.

The method of measuring a distance using ultrasonic waves is a method of calculating a distance by measuring a time that it takes for ultrasonic wave emitted from an ultrasonic wave generator of a mobile terminal to hit a subject and make its return. Further, the method of measuring infrared rays is a method of calculating a distance by measuring strength of infrared rays that returns after hitting a subject or a time that it takes for infrared ray to hit the subject and make its return.

The TTL method brings the camera into focus by analyzing an image obtained through a CCD/CMOS image sensor, and calculates a distance from a subject based on a location of a lens in the focused state. However, the method of measuring the distance using the infrared rays or ultrasonic waves is difficult to measure a distance up to a subject located at a far distance due to a limitation of a reachable distance of ultrasonic waves or infrared rays. Also, in this method, an accurate adjustment of focus on an object which is very close to a camera lens is hardly executed due to parallax.

Further, the TTL method can adjust the focus even on an object located at a far distance or an object very close to the camera lens, without any trouble. However, the CCD/CMOS image sensor cannot accurately detect contrast (details) of an object, such as an object (a blue sky, a monochromic wall, etc.) with a low contrast ratio, an object located at a place with less light, an object with high reflectivity, and the like, which results in a difficulty of distance measurement.

Therefore, a mobile terminal which measures a distance according to the related art method using the infrared rays or ultrasonic waves and the TTL method cannot measure an accurate distance, and thereby fails to perform an accurate AF function using those methods. Also, in the related art, the distance measurement technology is merely applied to a limited function, such as the auto focus, but fails to provide various functions and user interfaces (UIs) in association with an operation of content (or an application) output on a front display unit.

SUMMARY OF TIE INVENTION

Therefore, an aspect of the detailed description is to provide a mobile terminal capable of controlling an operation of content displayed on a front surface according to a spaced distance between a rear laser detection auto focus (LDAF) sensor and a finger, and a method of controlling content thereof.

Another aspect of the detailed description is to provide a mobile terminal capable of controlling an operation of content displayed on a front surface according to a spaced distance between a front proximity sensor and a finger, and a method of controlling content thereof.

To achieve these and other advantages and in accordance with the purpose of this specification, as embodied and broadly described herein, there is provided a method for controlling content of a mobile terminal, the method including outputting content on a front display unit, sensing a touch gesture applied to a distance detecting sensor, measuring a spaced distance of a linger, taken away from the distance detecting sensor after inputting the touch gesture, and controlling an operation of the content output on the front display unit according to the sensed touch gesture and the measured spaced distance.

To achieve these and other advantages and in accordance with the purpose of this specification, as embodied and broadly described herein, there is provided a mobile terminal including a front display unit configured to output content, a distance detecting sensor configured to sense a touch gesture, and a controller configured to measure a spaced distance of a finger which is taken away from the distance detecting sensor after inputting the touch gesture to the distance detecting sensor, and control an operation of the content output on the front display unit according to the touch gesture and the measured spaced distance.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood, that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
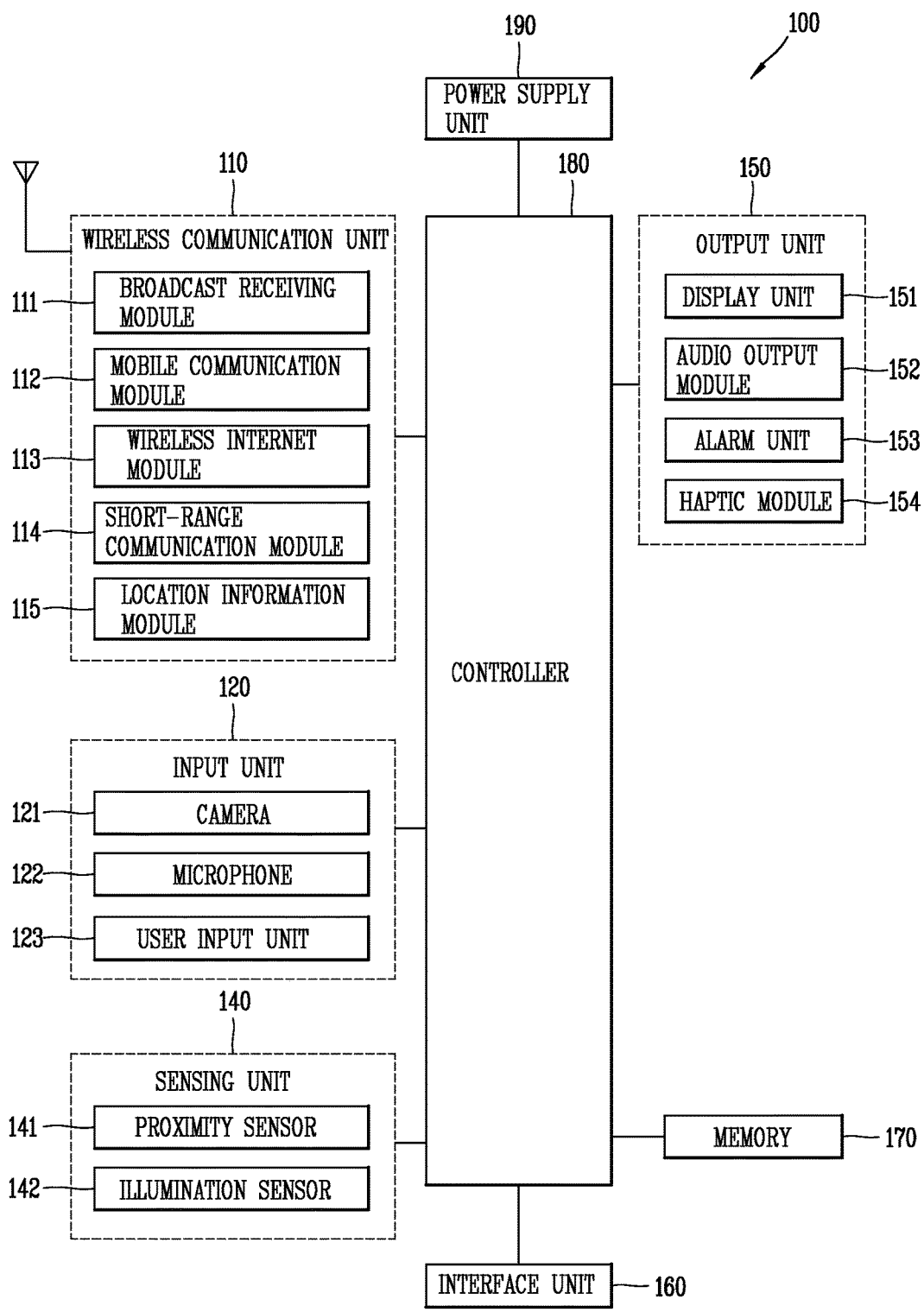
FIG. 1A is a block diagram of a mobile terminal in accordance with one exemplary embodiment of the present invention.
Figure 1B:
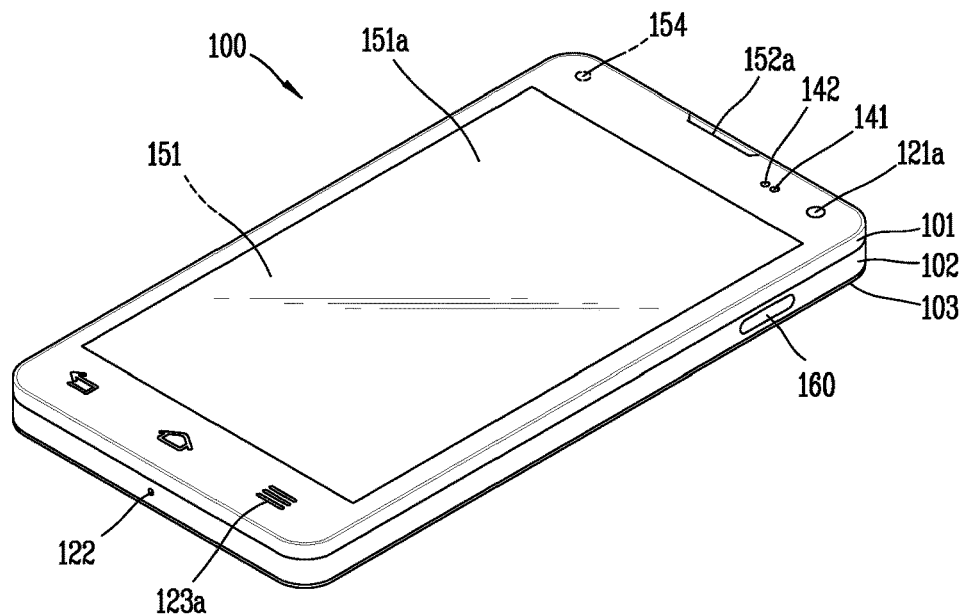
FIGS. 1B and 1C are conceptual views illustrating one example of the mobile terminal, viewed from different directions.
Figure 1C:
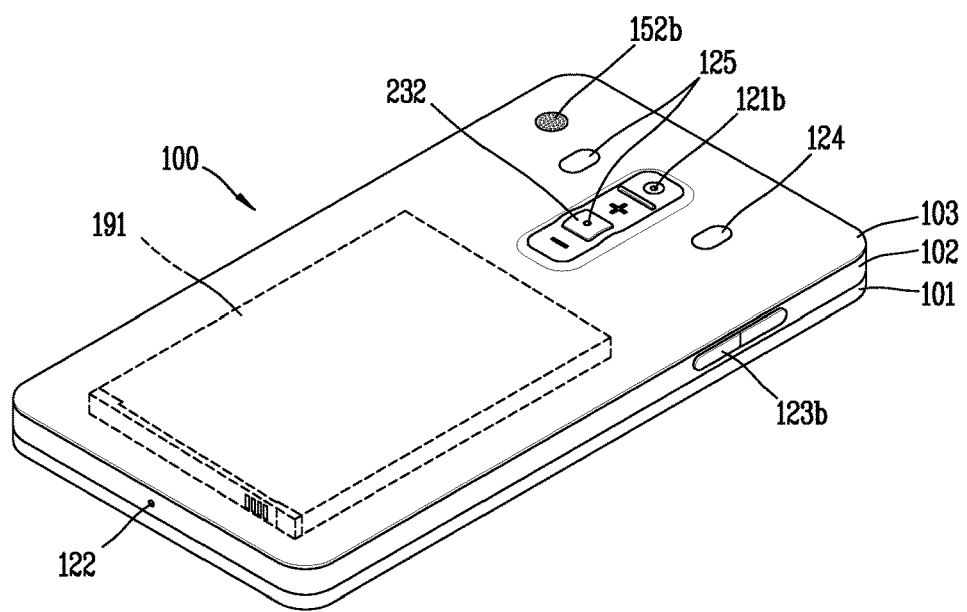

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions. The mobile terminal 100 may be shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks. The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for default functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well. In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal. 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and is not limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

Meanwhile, the controller 180 can execute the same or different controls according to a type of touch object that touches the touch screen or a touch key provided in addition, to the touch screen. Whether to execute the same or different control according to the object which provides a touch input may be decided based on a current operating state of the mobile terminal 100 or a currently executed application, program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control operations relating to application programs and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components is not limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen, information of an application program executing at the mobile terminal 100 or user interface (UI) and graphic user interface (GUI) information in response to the execution, screen information. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 and an LDAF sensor 125 may be disposed adjacent to the second camera 121b. When an image of a subject is captured through the camera 121b, the flash 124 may illuminate the subject. The LDAF sensor 125 is provided with a laser to emit a laser beam to the subject. A laser signal emitted from the LDAF sensor 125 hits the subject and makes its return. Accordingly, the controller 180 can measure a distance between the mobile terminal and the subject using the returned signal of the LDAF sensor 125, to automatically bring the camera into focus or control an operation of content output on the display unit 151.

The LDAF sensor 125 may be provided at a center of the rear input unit 232 in the form of a recess. The LDAF sensor 125 may measure a spaced distance up to a finger when the user touches the rear input unit 232 with the finger. Specifically, the LDAF sensor 125 may measure the spaced distance by taking into account an angle formed by the LDAF sensor 125 and the finger when it is disposed adjacent to the second camera 121b.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a control method to be implemented in the mobile terminal having such configuration and related embodiments will be described with reference to the accompanying drawings. It will be obvious to those skilled in the art that the present disclosure can be specified into other particular forms without departing from the spirit and essential characteristics of the present disclosure.

The present invention provides a method of controlling an operation of an application (or content) displayed on a front display unit after measuring a distance from a mobile terminal to a finger using a distance measurement sensor (or a distance detecting sensor) that is disposed at a front or rear surface of the mobile terminal.

The distance measurement sensor may be a laser detection auto focus (LDAF) sensor disposed at the rear surface or a proximity sensor disposed at one side of the front surface. A distance measured through the distance measurement sensor is used for controlling an operation of content displayed on the front display unit. In accordance with one embodiment, the present invention can provide various control functions for contents displayed on the front display unit, by measuring a spaced distance between an LDAF sensor disposed at the rear surface of the terminal and a reference object by use of a distance measurement technology using the LDAF sensor.

The reference object is an object used for distance measurement, and refers to a finger in the present invention. The LDAF sensor is provided with a laser (light) sensor that emits a laser signal toward a reference object, and thus measures a spaced distance up to a subject based on a return signal of the laser signal, emitted from the laser sensor, from the reference object. The LDAF sensor may include a laser generating portion to generate a laser signal, and a laser receiving portion to receive a reflected laser signal. The LDAF sensor or LDAF is used as the same meaning throughout this specification.

The LDAF sensor may be provided at one side (e.g., left or right) of a rear camera, or within a rear input unit 232 (or a rear button) (see FIGS. 1C and 2A). When the LDAF sensor is provided at the rear input unit 232, the LDAF sensor may be mounted in a central area in a shape of a recess. The rear input unit 232 may have at least one touch sensor that is uniformly distributed to sense a user's touch input.

The control function may include an information amount control (brief/detail, enlarge/reduce) for content that is output on the front display unit and viewed by the user, relation (correlation, connection, etc.) (high relation or low relation), a time (recent/past), and all of content control-associated operations, such as capture/save, scroll, enlarge/reduce, image arranging, screen switching, etc.

In accordance with another embodiment, the present invention can provide various control functions, as equal to the LDAF sensor, according to a proximity distance (or a spaced distance) between a proximity sensor that is disposed at a front surface of a mobile terminal and a reference object, which is measured by use of the proximity sensor. In the present invention, a spaced distance (or a proximity distance) is measured when a distance measurement sensor or a distance detecting sensor (e.g., the LDAF sensor or the proximity sensor) and a finger are arranged in a straight line, and when they are not arranged in the straight line, the arrangement may be adjusted by considering a viewing angle of a camera.

Figure 2:
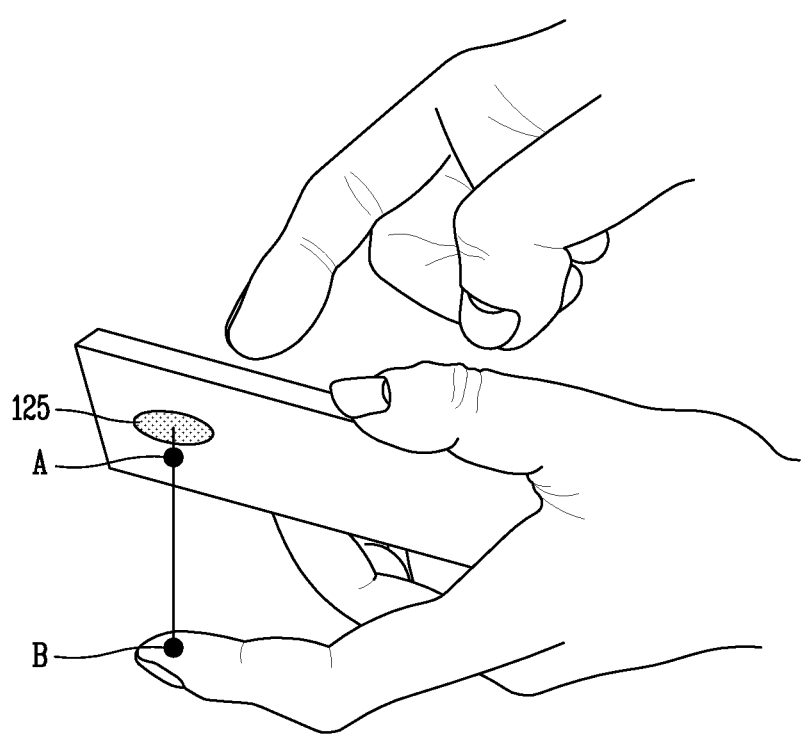
FIG. 2 is a conceptual view of a control operation according to a spaced distance between a rear LDAF sensor and a finger in accordance with the present invention.

Hereinafter, the preferred embodiments of the present invention will be described. FIG. 2 is a conceptual view of a control operation according to a spaced distance between a rear LDAF sensor and a finger in accordance with the present invention. As illustrated in FIG. 2, while grabbing a terminal with one hand (e.g., a left hand), a user cancan input a touch gesture (or a knock-on) on an LDAF sensor 125 with a finger (e.g., a forefinger) and then take (spaces) the finger away. The LDAF sensor is activated in response to the user's touch gesture, measures a spaced distance between the LDAF sensor 125 and the finger, and provides the measured spaced distance to the controller 180. The controller 180 can then perform a control operation for an application (or content) output on a front display unit 151 according to the measured spaced distance. For executing the control operation, the controller 180 performs a preset operation by comparing the measured spaced distance with a reference distance stored in the memory 170.

For example, when controlling a quantity of information relating to content, the controller 180 controls the information to be briefly displayed or reduced when the spaced distance decreases (A), and controls the information to be displayed in detail or enlarged when the spaced distance increases (B). As another example, when controlling relation (connection or correlation), time and depth of content, the controller 180 controls high relation, a recent time and a depth to be reduced when the spaced distance decreases (A), and controls low relation, a past time and the depth to be increased when the spaced distance increases (B).

The present invention is not limited to controlling a performing degree or range of a specific control operation for content according to a spaced distance. The present invention can also individually control a plurality of control operations according to the spaced distance.

Figure 3A:
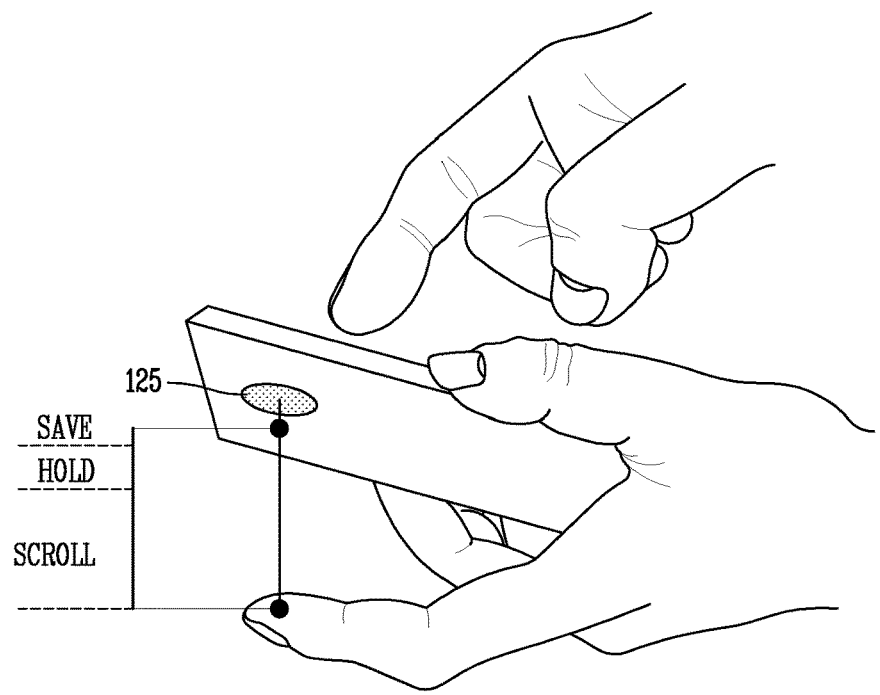
FIGS. 3A and 3B are conceptual views of performing different control operations according to a spaced distance between a rear LDAF sensor and a finger in accordance with the present invention.
Figure 3B:
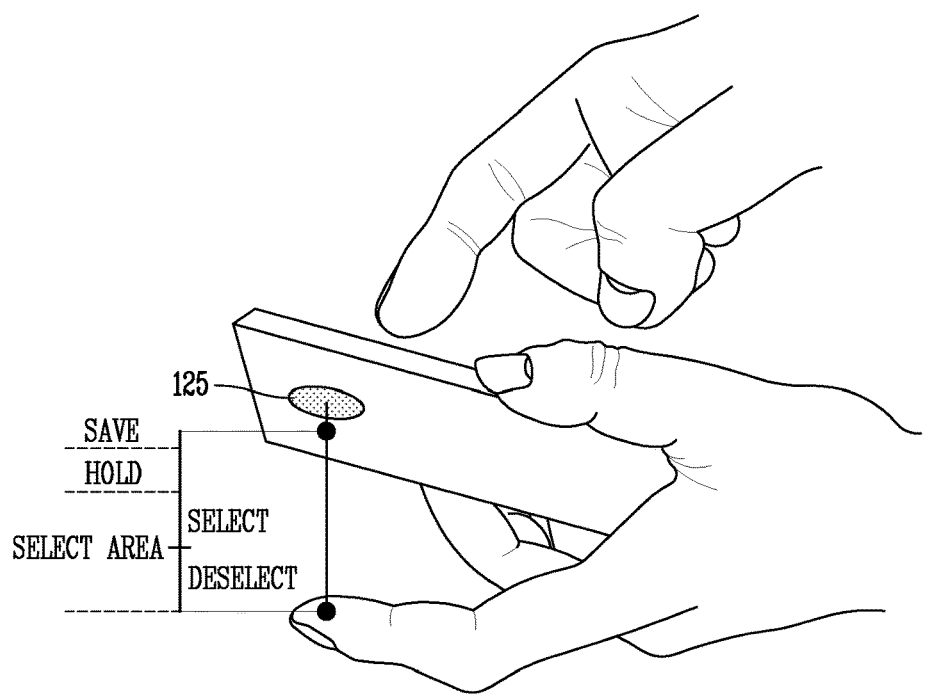

Next, FIGS. 3A and 3B are conceptual views of performing different control operations according to a spaced distance between a rear LDAF sensor and a finger in accordance with the present invention. As illustrated in FIG. 3A, the controller 180 can provide different functions by dividing a spaced, distance into a save area, a hold area, a scroll area and an enlarge area. For example, after a specific area is selected from content output on the front display unit 151, when a finger touches the LDAF sensor 125 and then is spaced from the LDAF sensor 125, the controller 180 can perform one of a storing operation, a holding operation, a scroll operation and an enlarging operation for the selected area according to a spaced distance between the LDAF sensor 125 and the finger. Specifically, when the scroll operation is performed, the controller 180 can control a scroll speed (slow→fast) according to the spaced distance. In this instance, the storage is performed when the spaced distance between the LDAF sensor 125 and the finger is 0, namely, when the LDAF sensor 125 is touched.

Such control areas according to the spaced distance may differently be set according to an application (or content) output on a front screen. As another embodiment, as illustrated in FIG. 3B, when content output on the front display unit 151 is automatically scrolled, the controller 180 can decide selection or deselection of an area to save the content, as well as saving or holding the content, according to the spaced distance.

Figure 4:
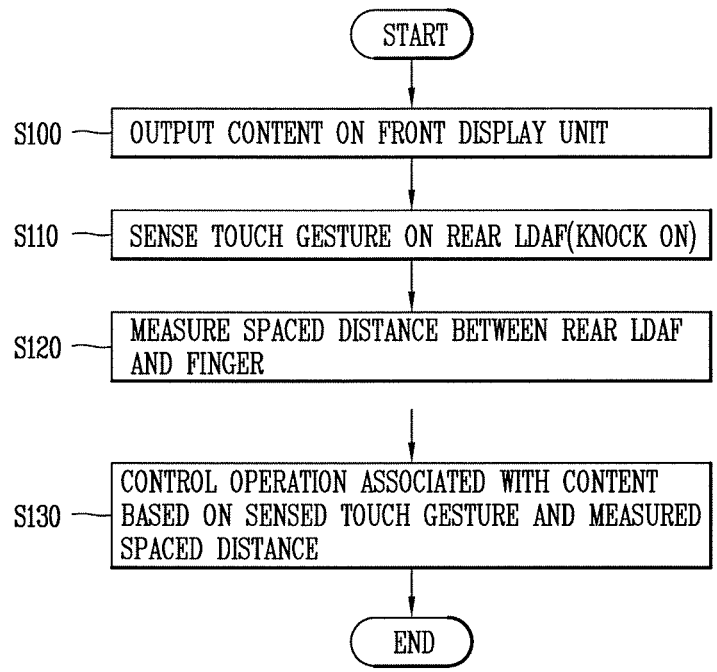
FIG. 4 is a flowchart illustrating a method of controlling content according to a spaced, distance of a finger in accordance with an embodiment of the present invention.

Next, FIG. 4 is a flowchart illustrating a method of controlling content according to a spaced distance of a finger in accordance with an embodiment of the present invention. As illustrated in FIG. 4, a user-selected content can be displayed on the front display unit 151 (S100). The content is content (e.g., a webpage) having at least one page, and may include a text view, an image view (e.g., a photo), and an audio view. Under this state, when the user applies a touch gesture to (e.g., knockon) to the LDAF sensor 125 of the rear input unit 232 with a forefinger, the LDAF sensor 125 is activated (S110). Afterwards, when the forefinger is spaced apart from the LDAF sensor 125, the LDAF sensor 125 emits a laser to the forefinger to measure a spaced distance up to the forefinger in real time (S120). The LDAF sensor 125 may also be activated when the rear input unit 232 is touched by knocking on it.

The controller 180 then performs a control operation for the content output on the front display unit 151 based on the sensed touch gesture and the spaced distance measured through the LDAF sensor 125 (S130). The control, operation can relate to editing, selecting, storing and moving the content.

In the present invention, a state of pushing the LDAF sensor 125 with a finger after knocking on it ("knock knock") is referred to as 'KnockOn+Touch down push,' a state of keeping touching the LDAF sensor 125 with the finger after knocking on it ("knock knock") is referred to as 'KnockOn+Touch down,' a state of removing the finger simply from the LDAF sensor 125 after knocking on it ("knock knock") is referred to as 'KnockOn+Touch up,' and a state of holding the finger away from the LDAF sensor 125 after knocking on it ("knock knock") is referred to as 'KnockOn+Touch up hold.'

Figure 5:
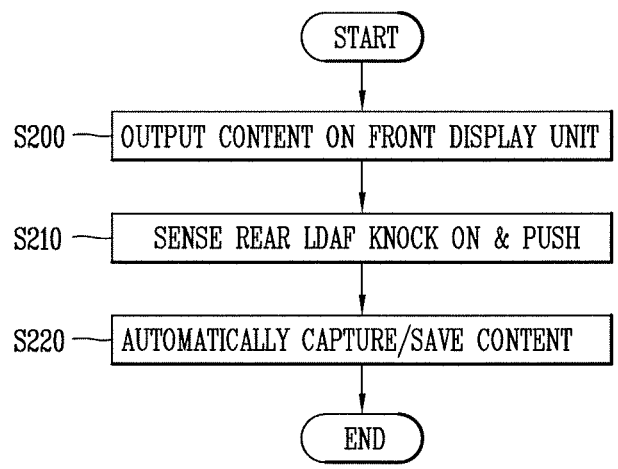
FIG. 5 is a flowchart illustrating sequential steps of performing a default capture function using a rear LDAF sensor.
Figure 6:
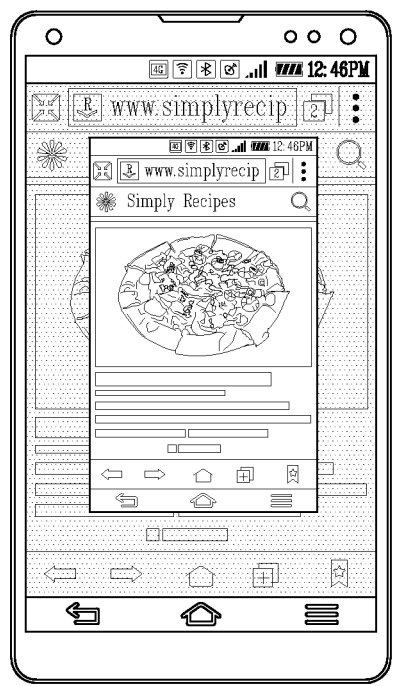
FIG. 6 is a view illustrating a detailed embodiment of FIG. 5.
Figure 6:
Figure 6:
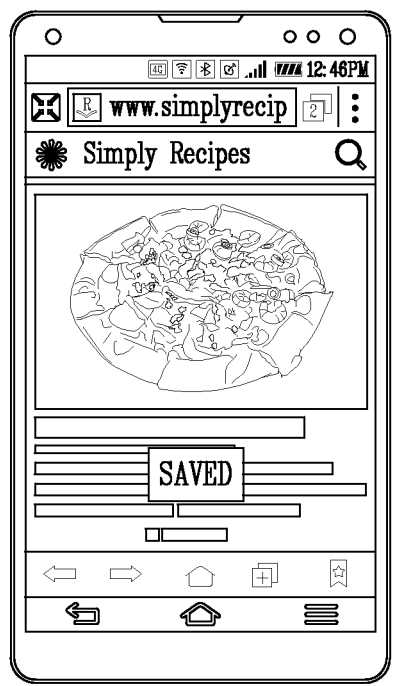

The KnockOn is a type of a touch gesture, and includes an operation of tapping a screen one time ('knock') or two or more times ('knock knock'). 'KnockOn+Touch up hold' refers to an operation of holding the finger at a hold area after removing the finger from the LDAF sensor 125. A spaced distance in the state of 'KnockOn+touch up hold' is longer than a spaced distance in the state of 'KnockOn+touch up' in which the finger is simply taken away from the LDAF sensor 125. Control of information quantity of content Next, FIG. 5 is a flowchart illustrating sequential steps of performing a default capture function using a rear LDAF sensor, and FIG. 6 is a view illustrating a detailed embodiment of FIG. 5. As illustrated in FIGS. 5 and 6, a predetermined content (e.g., a webpage) may be output on the front display unit 151 (S200). When the user applies 'KnockOn & Touch down push' to the rear LDAF sensor 125 with a forefinger while viewing the webpage (S210), the controller 180 automatically captures a current screen and saves the captured screen in the memory 170 (S220). In this embodiment, a spaced distance between the LDAF sensor 125 and the finger is 0.

Figure 7:
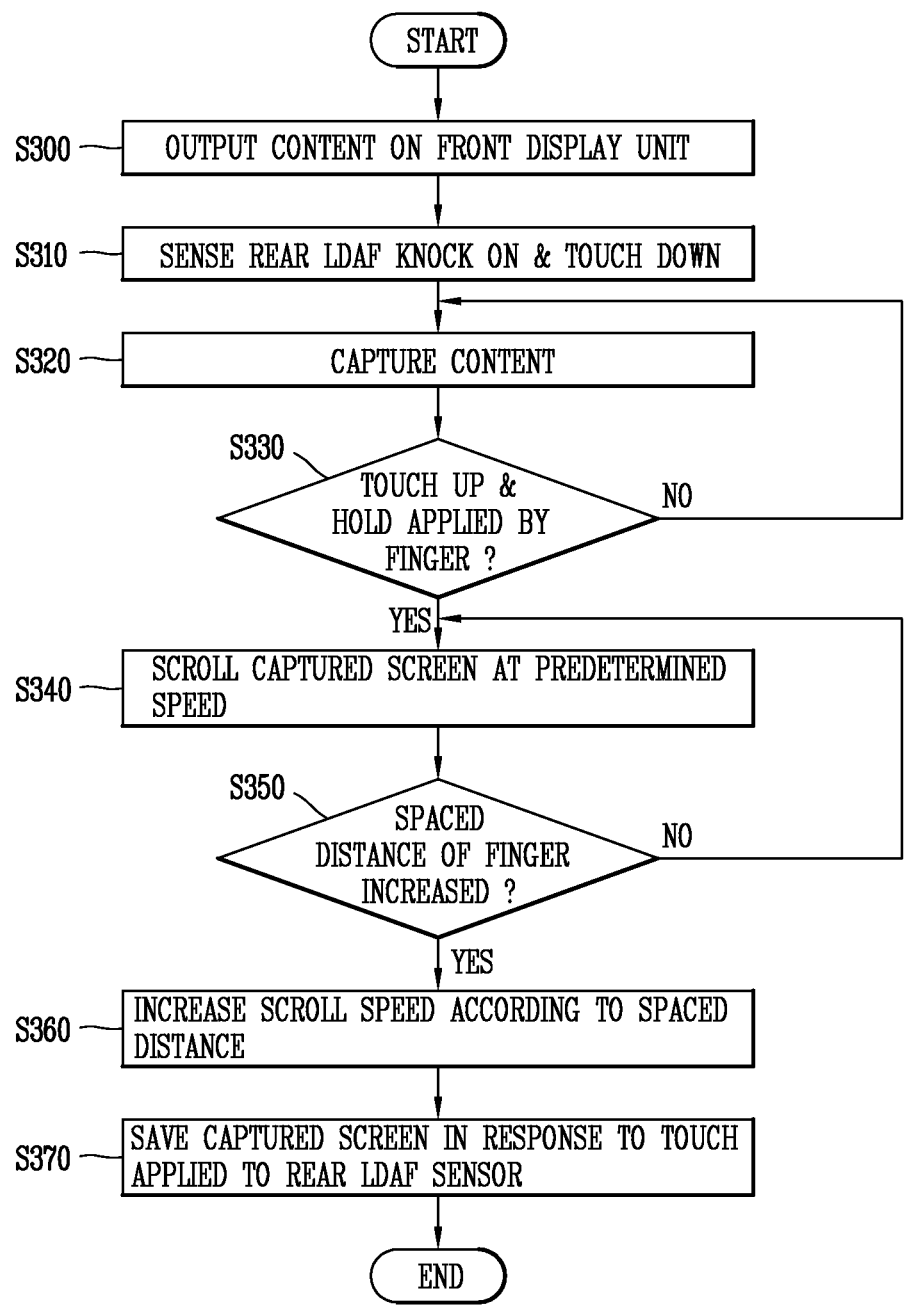
FIG. 7 is a flowchart illustrating an applied capture operation using a rear LDAF sensor.
Figure 8:
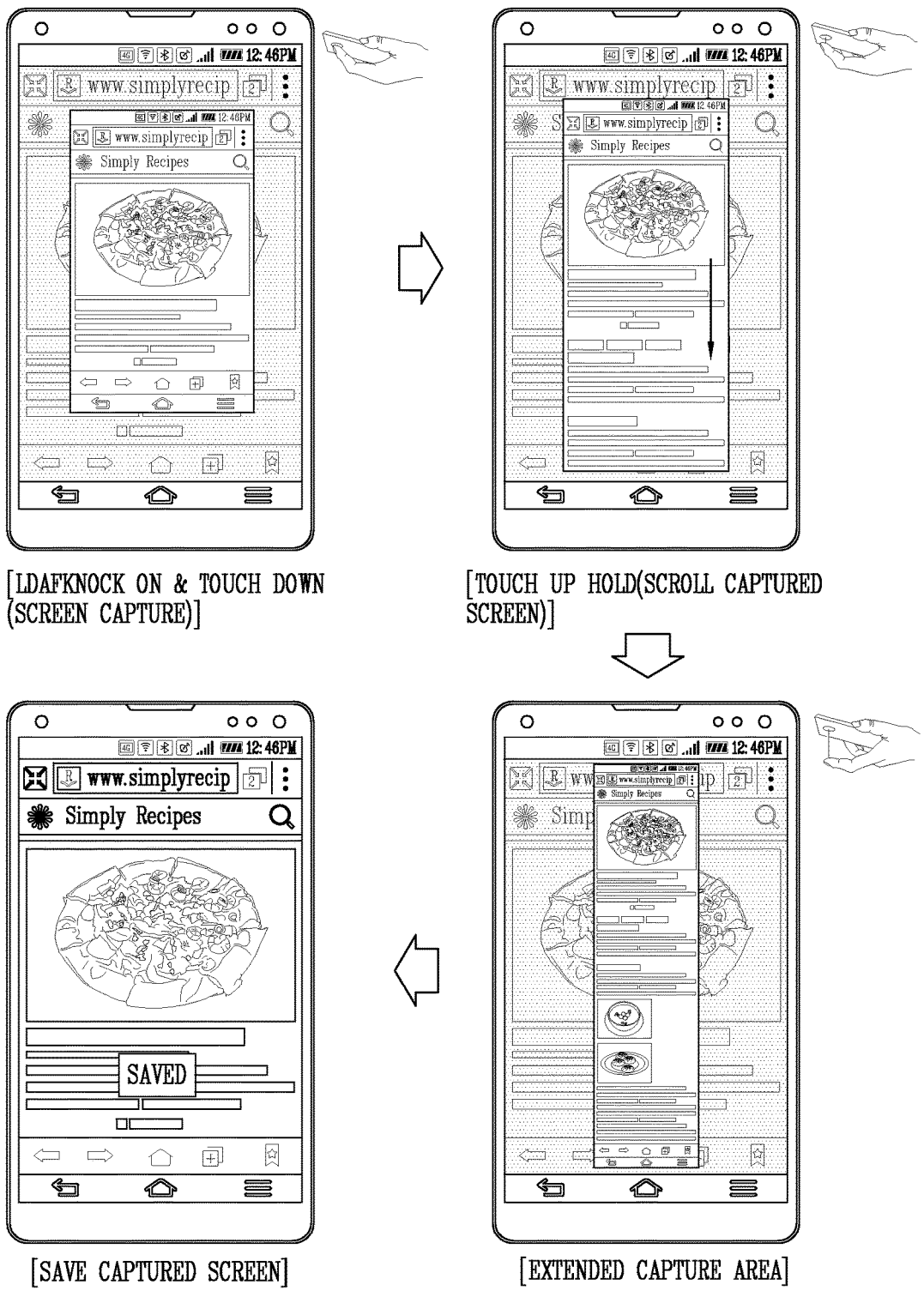
FIG. 8 is a view illustrating a detailed embodiment of FIG. 7.

Next, FIG. 7 is a flowchart illustrating an applied capture function using a rear LDAF sensor, and FIG. 8 is a view illustrating a detailed embodiment of FIG. 7. As illustrated in FIGS. 7 and 8, while the webpage is displayed on the front display unit 151, when the user knocks on ('knock' or 'knock knock') the rear LDAF sensor 125 with the forefinger and keeps touching the LDAF sensor (KnockOn+Touch down) with the finger, the controller 180 activates a capture operation, captures the current webpage and outputs the captured webpage (S300 to S320).

In this state, when the forefinger is held in a spaced state apart from the LDAF sensor 125 (see FIG. 4A) (S330), the controller 180 scrolls down the captured screen at a predetermined speed to extend a capture area (S340). During the scroll, sizes of the captured screen and a view may change. Afterwards, when the spaced distance (scroll area) increases more, the controller 180 increases the scroll speed in proportion to the spaced distance, so as to further extend the capture area (S360). Therefore, the user can select a desired save area through the scroll operation. When the user touches the LDAF sensor 125 again with the forefinger during the scroll operation, the captured screen at the corresponding time point can be stored (S370).

Figure 9:
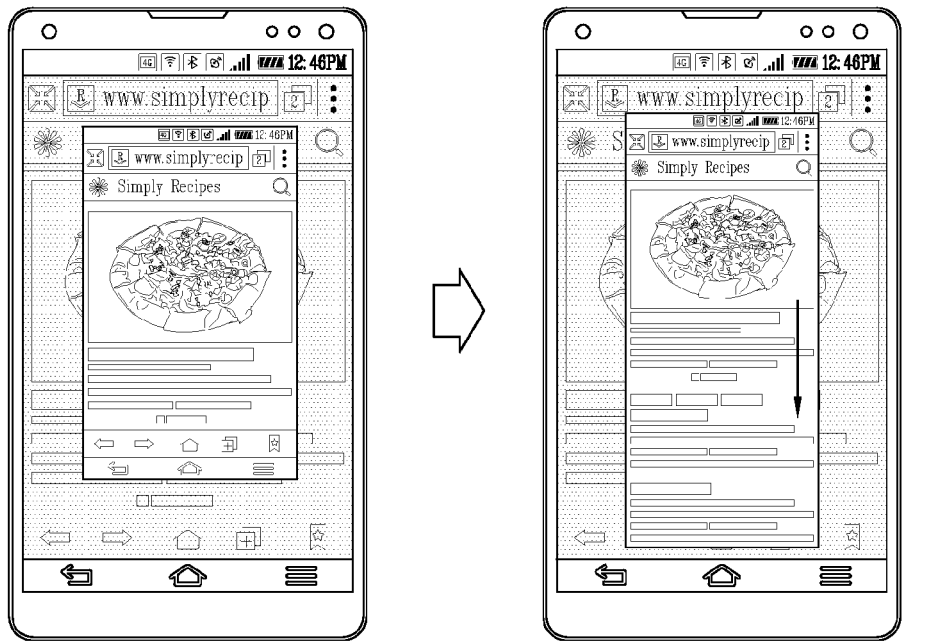
FIGS. 9 and 10 are views illustrating an embodiment of performing an applied capture operation using a rear LDAF sensor.
Figure 9:
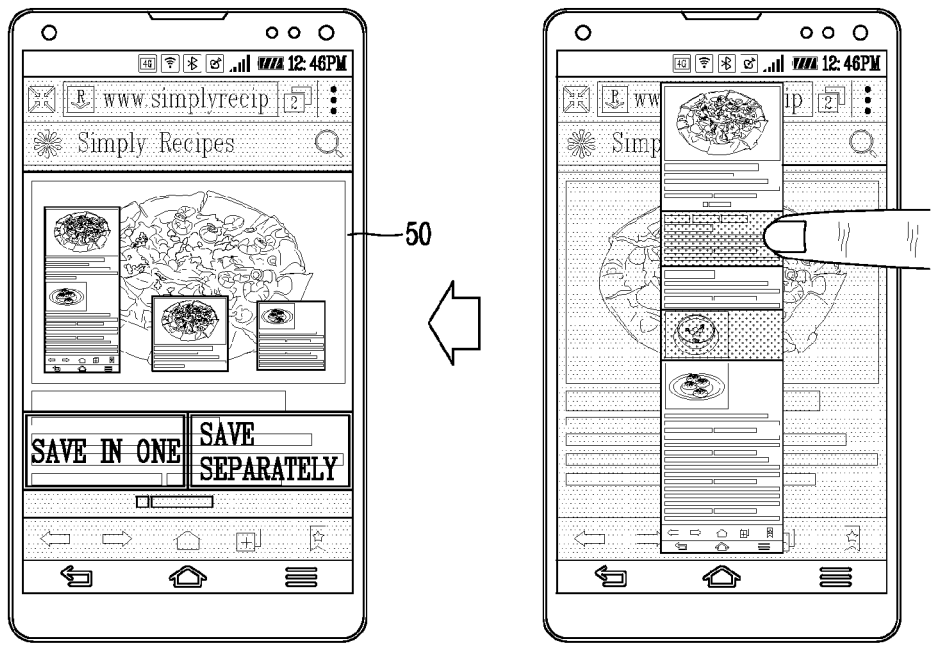
Figure 10:
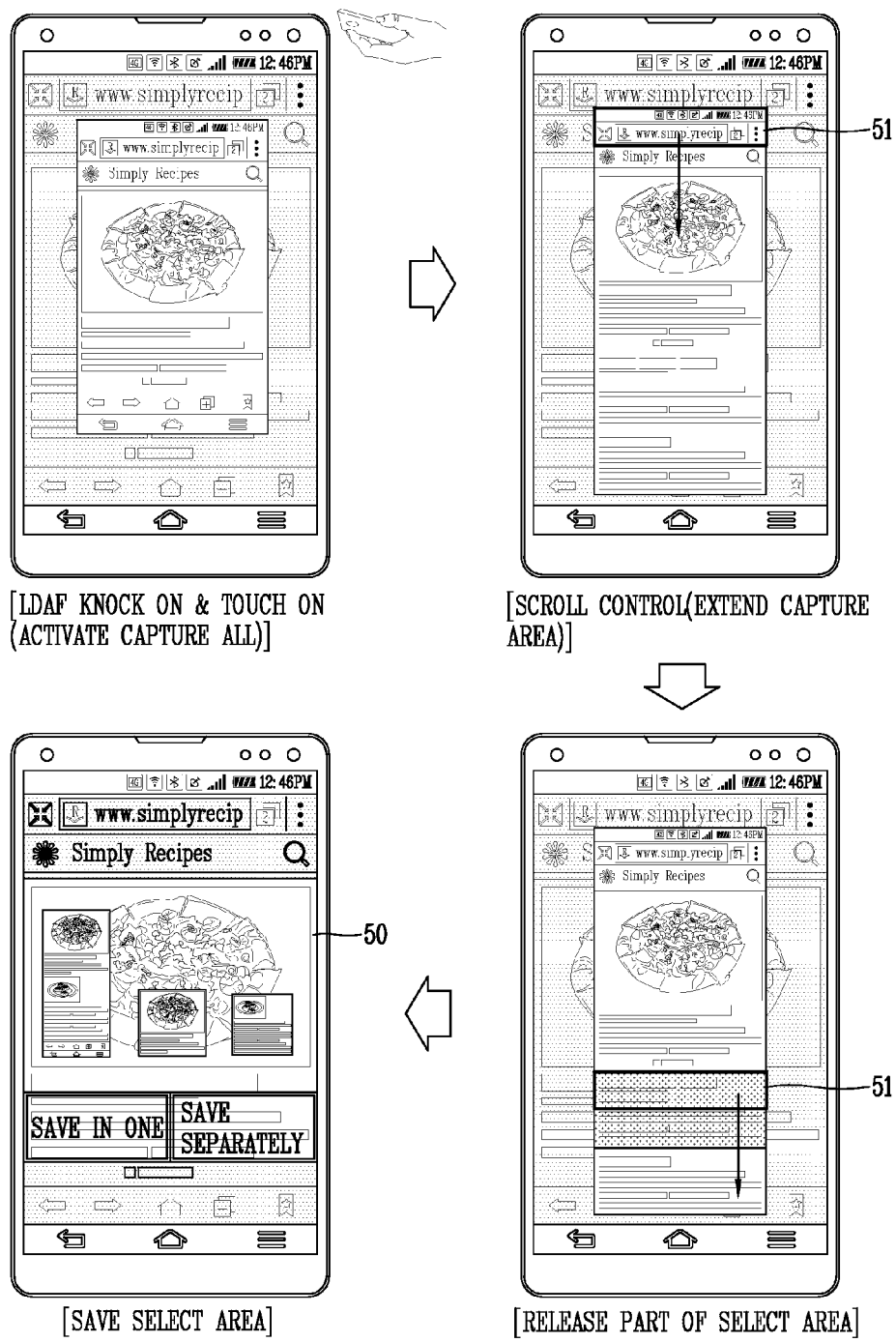

FIGS. 9 and 10 are views illustrating an embodiment of performing an applied capture operation using a rear LDAF sensor, which illustrates a capture all operation. As illustrated in FIG. 9, while a webpage is output on the front display unit 151, when the user removes a finger after knocking on the rear LDAF sensor 125 ('knock' or 'knock knock'), the controller 180 activates a capture all operation and simultaneously captures the current webpage to output on the front display unit 151.

Afterwards, when a spaced state of the finger is held, the controller 180 scrolls down the captured screen at a predetermined speed to extend a capture area. When the spaced distance more increases, the controller 180 increases a scroll speed and outputs an entire area of the webpage. In such rear surface control state (spacing by the forefinger), the user can select a save area by touching a text view and/or an image view included on the captured screen, and then save the selected save area by retouching the LDAF sensor 125 with the forefinger. When the save area is in plurality, the controller 180 provides a popup window 50 for the user to select 'save in one' or 'save separately.'

Also, as illustrated in FIG. 10, when the user takes the finger away by a predetermined distance and holds the state just after knocking on (e.g., 'knock knock') the rear LDAF sensor 125, the controller 180 automatically scrolls down the captured screen along with a block 51 to extend the capture area. If a select area is included in the captured screen, a portion corresponding to the block. 51 is deselected. Afterwards, the user retouches the LDAF sensor 125 with the forefinger to save the preselected save area in the memory 170.

As described above, the present invention may control a quantity of information output on the front display unit 151 using the LDAF sensor. The control of the quantity of information may include control operations to be explained later, in addition to extending the capture area through the aforementioned scroll operation.

Figure 11:
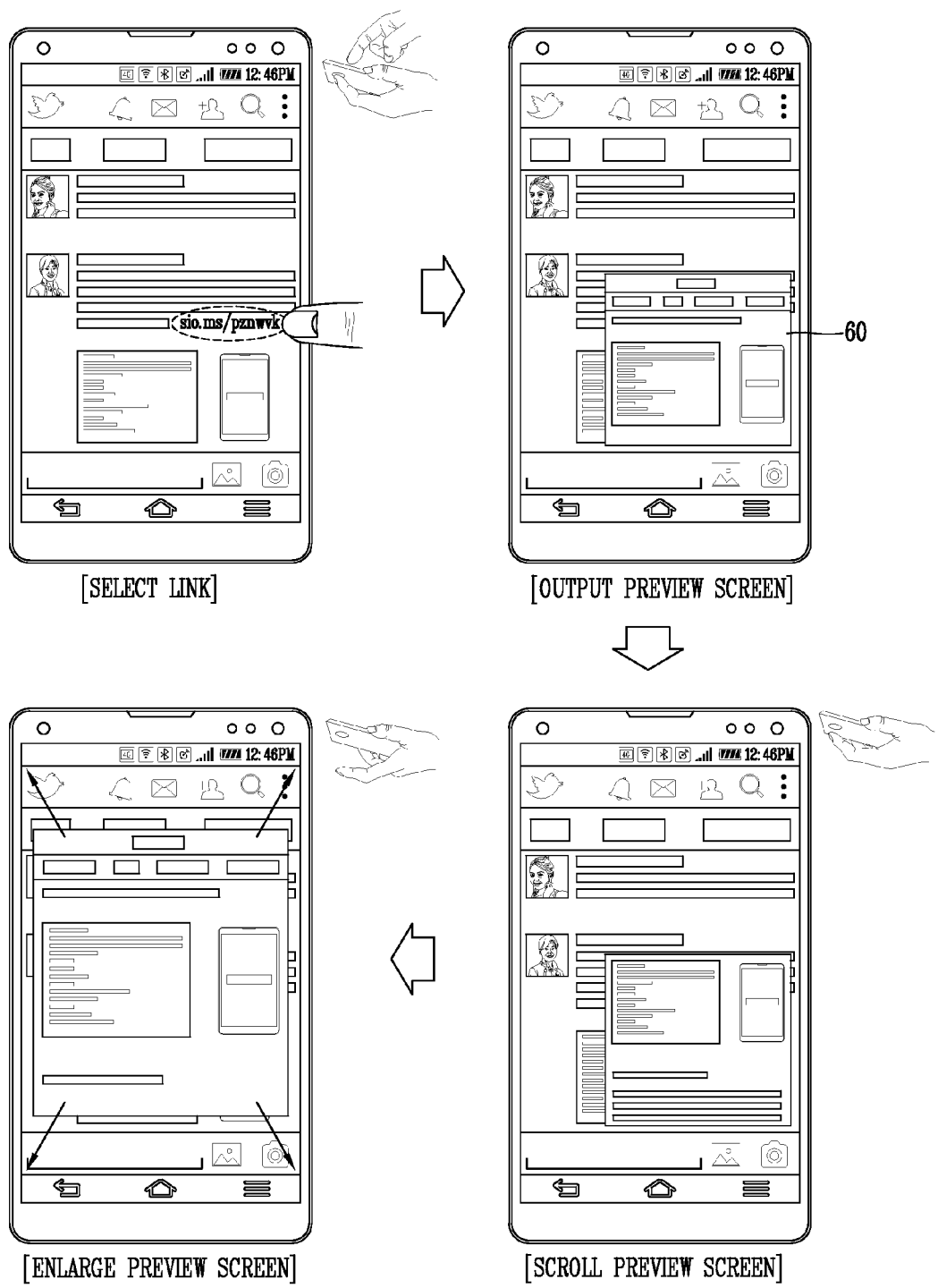
FIG. 11 is a view illustrating an embodiment of controlling a preview screen using an LDAF sensor.

FIG. 11 is a view illustrating an embodiment of controlling a preview screen using an LDAF sensor. While the user touches the rear LDAF sensor 125 with a forefinger, a webpage may be output on the front display unit 151. The webpage may include at least one link. In this state, when a predetermined link included on the webpage is selected by another finger and then the forefinger is taken away, the controller 180 pops up a preview screen 60 of the corresponding link.

Afterwards, when the user holds the forefinger, the controller 180 starts to scroll the preview screen 60. When the forefinger is more spaced apart from the LDAF sensor 125, the controller 180 starts to enlarge the preview screen 60. The controller 180 gradually increases an enlargement magnification according to the spaced distance of the forefinger. When the preview screen 60 is enlarged more than a predetermined size, the controller 180 switches the webpage screen into the preview screen 60.

Figure 12:
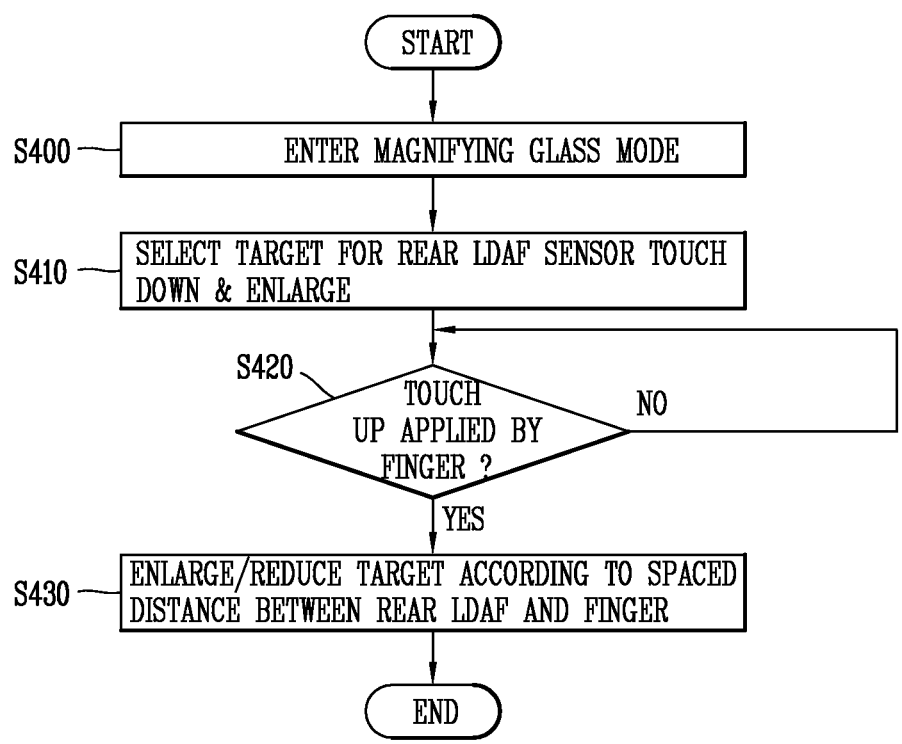
FIG. 12 is a flowchart illustrating a control operation of enlarging a screen using an LDAF sensor.
Figure 13:
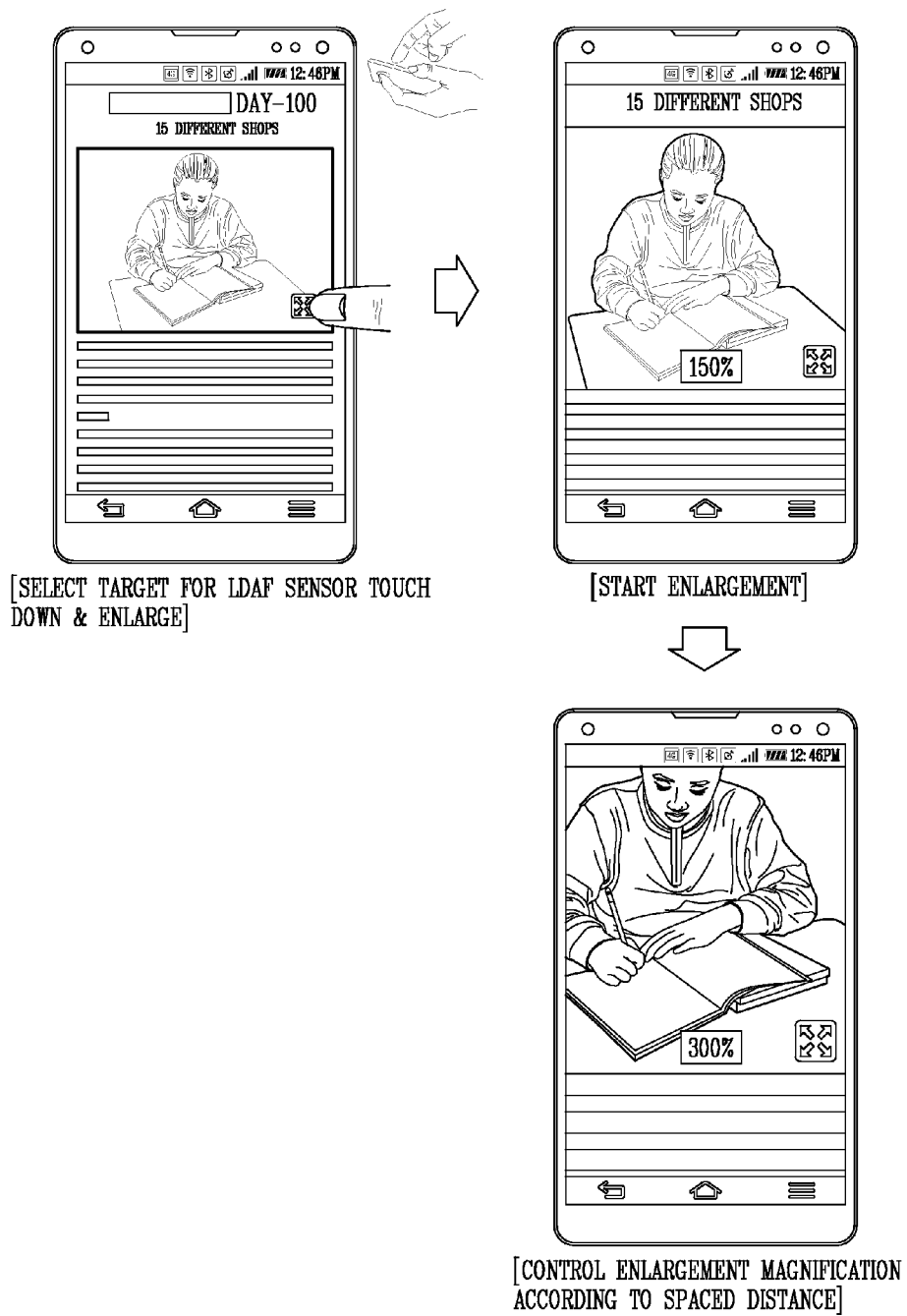
FIG. 13 is a view illustrating a detailed embodiment of FIG. 12.

FIG. 12 is a flowchart illustrating a control operation of enlarging a screen using an LDAF sensor, and FIG. 13 is a view illustrating a detailed embodiment of FIG. 12. As illustrated in FIGS. 12 and 13, after entering a magnifying glass mode, the user can select a subject (a specific content page) to enlarge from content output on the front display unit 151 using a finger of another hand while touching the rear LDAF sensor 125 with a forefinger (S400 and S410).

In this state, when the user takes the finger away from the rear LDAF sensor 125, the controller 180 starts to enlarge the subject, and enlarges the subject with controlling an enlargement magnification according to the spaced distance (S420 and S430). Afterwards, when the user shortens the spaced distance again, the controller 180 reduces the enlarged screen. When the rear LDAF sensor 125 is touched, the controller 180 displays an initial screen. Thus, the present invention can control the relation (or correlation), time, depth of the content, as well as controlling the quantity of information of the content according to the spaced distance of the finger using the LDAF sensor.

Control of Relation/Time/Depth

Figure 14:
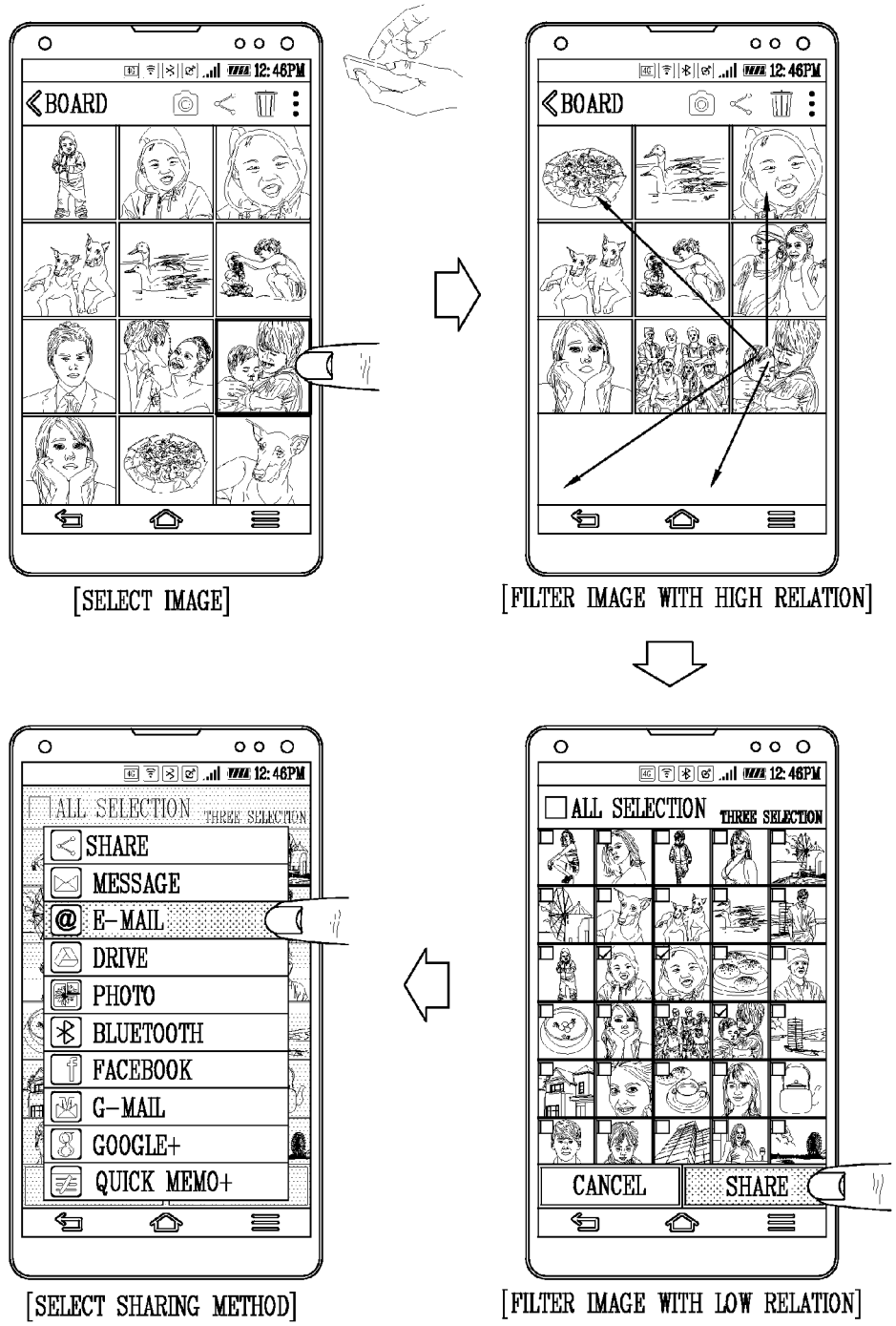
FIG. 14 is a view illustrating an embodiment of controlling a relation (connection or correlation) of content using an LDAF sensor.

FIG. 14 is a view illustrating an embodiment of controlling relation (connection or correlation) of content using an LDAF sensor. As illustrated in FIG. 14, while touching the rear LDAF sensor 125 with a finger, the user can select a target (e.g., a photo) to arrange from content (e.g., a gallery) output on the front display unit 151 with a finger of another hand. When the content is text, a predetermined file may be selected. Specifically, when a plurality of persons or objects are included in the photo, the user can select a specific person or object.

After the user selects the target to arrange, when the finger is spaced apart from the rear LDAF sensor 125, the controller 180 filters out photos with high relation to the selected photo and outputs the filtered photos around the selected photo. When the finger is more spaced to be over a predetermined distance, the controller 180 filters and outputs all the photos associated with the selected photo including photos with low relation. The user can share all or part of the filtered photos with another person by selecting a sharing method using a share button.

Figure 15:
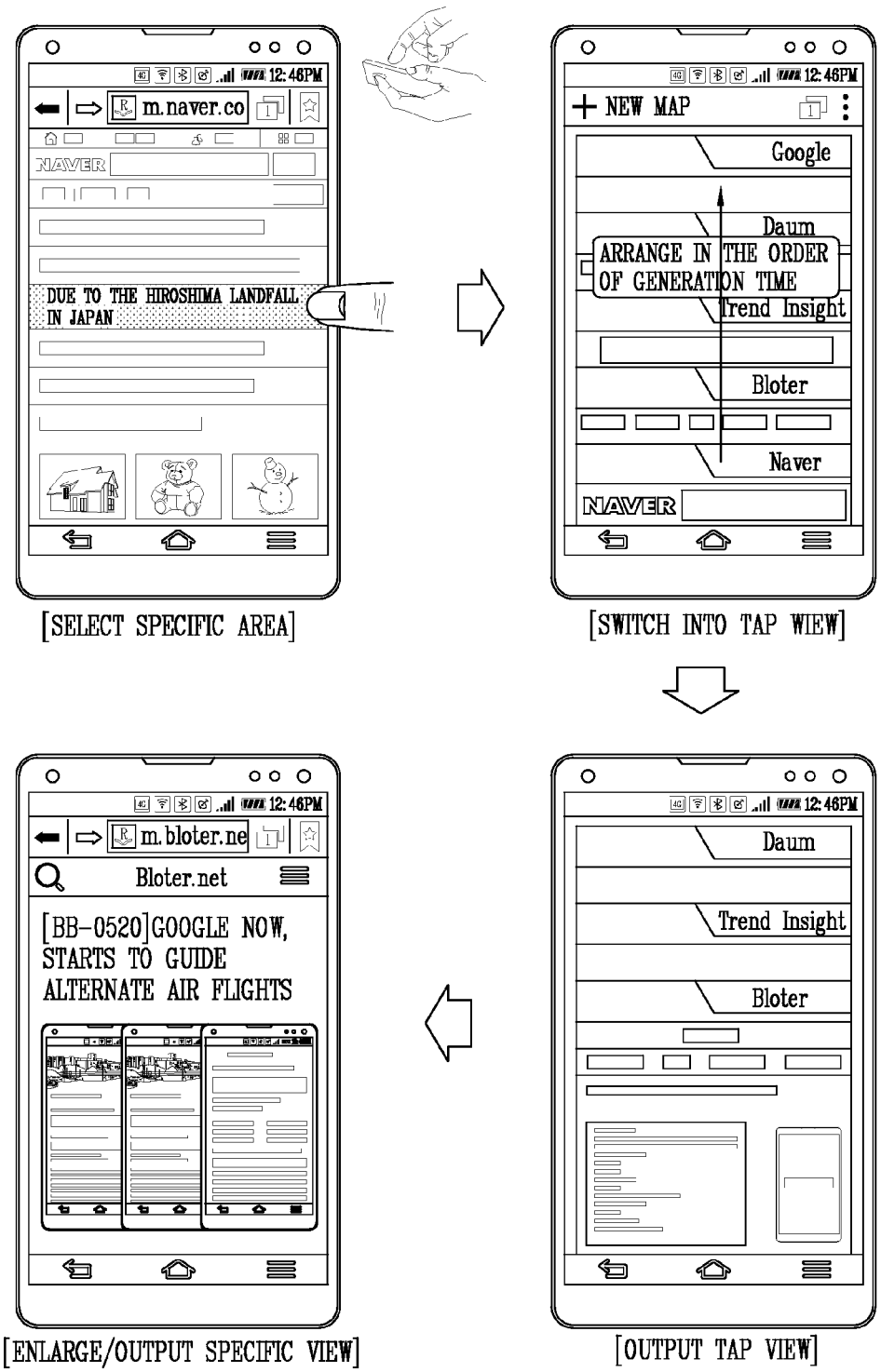
FIG. 15 is a view of arranging contents on the time basis using an LDAF sensor.

FIG. 15 is a view of arranging contents on the time basis using an LDAF sensor. As illustrated in FIG. 15, the user can output a predetermined webpage on the front display unit 151. While contacting the rear LDAF sensor 125 with a finger, when the user selects specific information (e.g., a news item) on the webpage and thereafter takes the finger away from the LDAF sensor 125, the controller 180 switches the webpage into a tab view, and arranges and outputs a plurality of webpages related to the selected information on the front display unit 151 in the order of generation time. Here, the most-recently generated tab view may be displayed on the top layer.

When the user holds the finger, the controller 180 switches the tab view output on the top layer into the next tab view in a sequential manner. If the finger is more spaced apart from the LDAF sensor 125 after a specific tab view is output, the controller 180 enlarges the corresponding tab view for output. In general, when a power key is pressed, one lock screen selected by a user is output on the display unit 151. The user then inputs a knockon, a lock pattern or a password on the corresponding lock screen so as to enter an idle screen. However, the use of only one lock screen is disadvantageous in the aspect of security and also fails to get the user interested.

Therefore, the present invention provides a method of reinforcing security and attracting the user by continuously providing a plurality of lock screens or providing a lock screen that the user arbitrary selects. Thus, the present invention may assign different types of lock screens to a plurality of layers, so as to provide a specific lock screen, or a combination of lock screens and perform an unlock operation of such lock screen(s) according to a spaced distance between the LDAF sensor and a finger.

The present invention is described under assumption that a first lock screen is located at the top layer, and second and third lock screens are sequentially present at lower layers. Each layer of the lock screens corresponds to the spaced distance between the LDAF sensor and the finger in an individual or combination manner.

Figure 16:
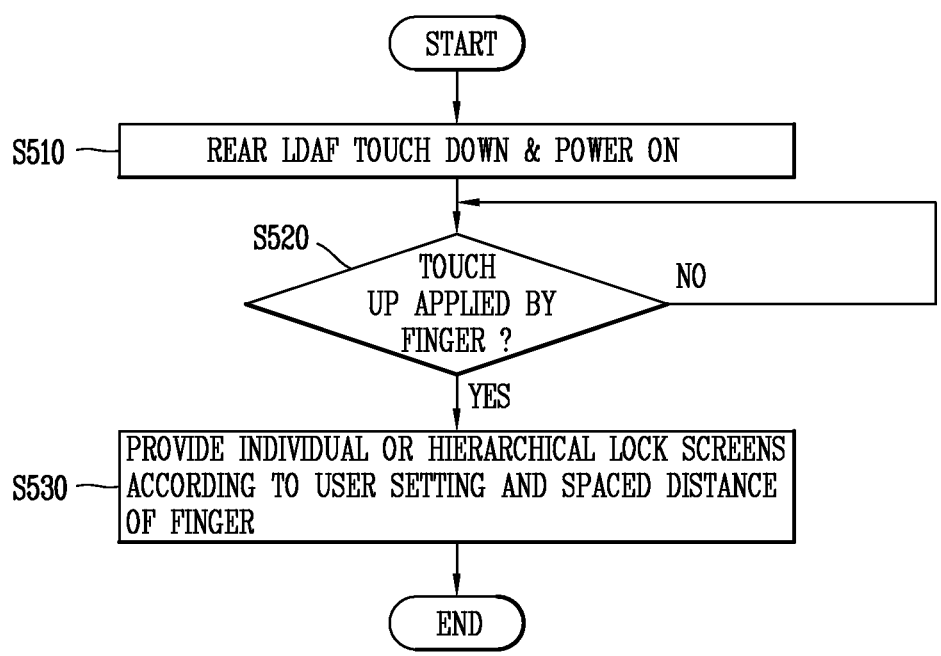
FIG. 16 is a flowchart illustrating sequential steps of controlling lock screens using an LDAF sensor.

FIG. 16 is a flowchart illustrating sequential steps of controlling lock screens using an LDAF sensor. As illustrated in FIG. 16, a user can supply power by pressing a power key, which is located at a side surface of the mobile terminal, while touching the LDAF sensor 125 with a finger.

When the power is turned on through the power key, the controller 180 provides preset individual or hierarchical lock screens according to user setting (selection of individual or hierarchical lock screen) and a spaced distance between the LDAF sensor and the finger (S520, S530). Thus, the user can preset one of individual or hierarchical lock screens in a menu.

As one example, when the individual lock screen is set, the controller 180 provides different types of lock screens (knockon input, touch pattern input, password input) according to a spaced distance. When the hierarchical lock screen is set, the controller 180 sequentially provides a combination of different types of lock screens.

Figure 17A:
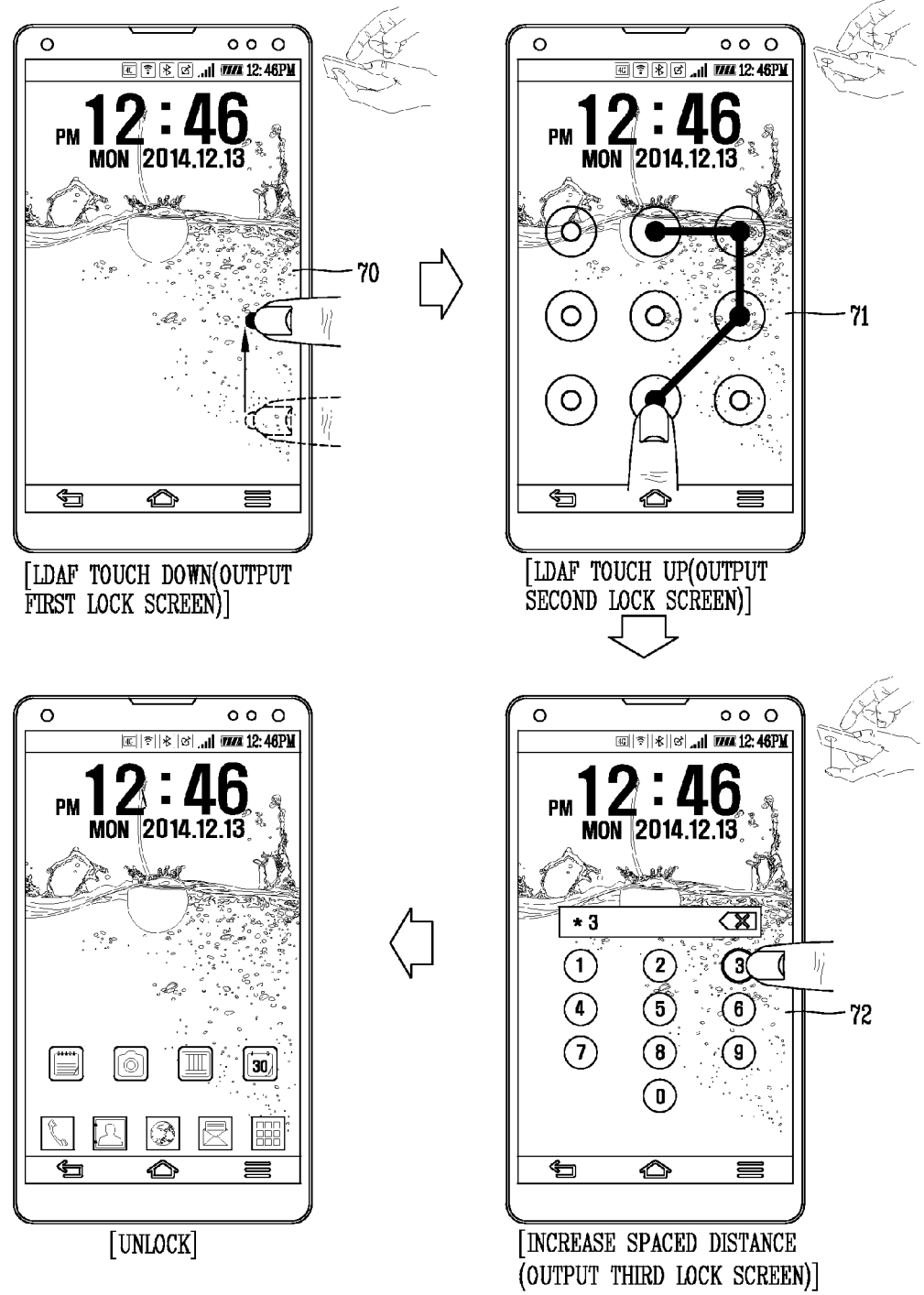
FIGS. 17A and 17B are views illustrating an embodiment of controlling different types of lock screens using an LDAF sensor.
Figure 17B:
Figure 17B:
Figure 17B:
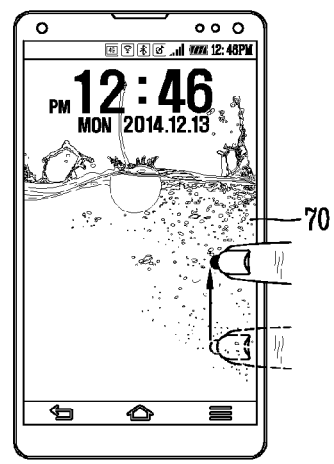
Figure 17B:
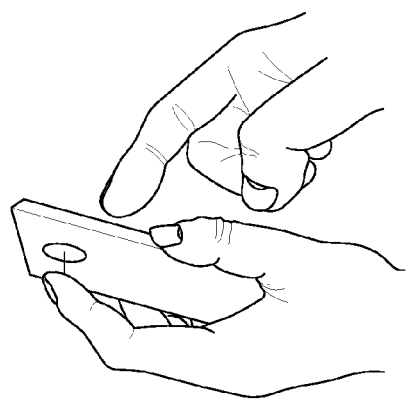
Figure 17B:
Figure 17B:
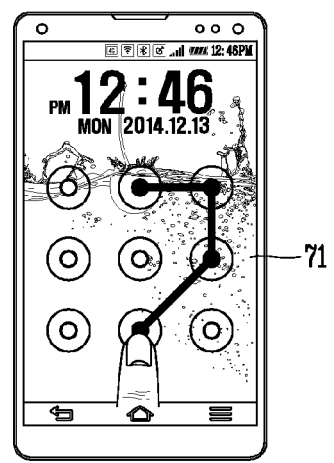
Figure 17B:
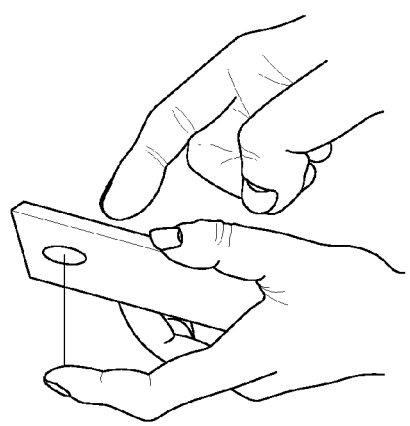
Figure 17B:
Figure 17B:
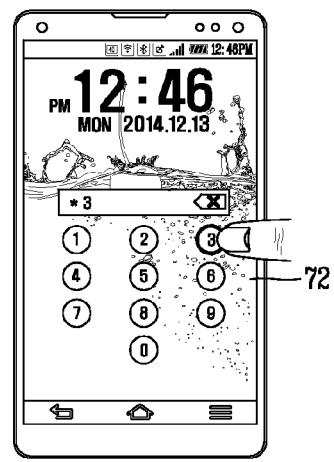

FIGS. 17A and 17B are views illustrating an embodiment of controlling different types of lock screens using an LDAF sensor. As illustrated in FIG. 17A, the controller 180 can sequentially output at least one different lock screen according to a spaced distance between the LDAF sensor and a finger.

In one embodiment, when a user keeps touching the LDAF sensor 125 (Touch down), the controller 180 outputs a first lock screen 70 which can be unlocked by inputting a knock code. The user then inputs the knock code on the first lock screen 70. When the input knock code is equal to a prestored code, the controller 180 checks whether or not more lock screens relating to the first lock screen 70 are present.

When no more lock screen relating to the first lock screen 70 is present according to the check result, the controller 180 unlocks the first lock screen 70 (screen lock) and outputs an idle screen. Further, when there is a lock screen relating to the first lock screen 70, the controller 180 waits for the next input while maintaining a lock state of the first lock screen 70.

Afterwards, when the finger which is touching the LDAF sensor 125 is spaced from the LDAF sensor 125 by a first distance, the controller 180 outputs a second lock screen 71 which can be unlocked by a touch pattern. The user then inputs the touch pattern on the second lock screen 71. When the input touch pattern is equal to a prestored pattern, the controller 180 checks whether or not more lock screens relating to the second lock screen 71 are present.

When no more lock screen relating to the second lock screen 71 is present according to the check result, the controller 180 unlocks the second lock screen 71 and outputs an idle screen. Further, when there is a lock screen relating to the second lock screen 70, the controller 180 waits for the next input while maintaining a lock state of the second lock screen 71.

Afterwards, when the finger which is touching the LDAF sensor 125 is spaced from the LDAF sensor 125 by a second distance, the controller 180 outputs a third lock screen 72 which can be unlocked by a password. The user then inputs the password on the third lock screen 72. When the input password is equal to a prestored number, the controller 180 checks whether or not more lock screens relating to the third lock screen 72 are present.

When no lock screen relating to the third lock screen 72 is present according to the check result, the controller 180 unlocks the third lock screen 72 and outputs an idle screen. In this embodiment, the first to third lock screens are sequentially linked to one another. Thus, the user unlocks the lock screen, when at least two inputs of the three types of inputs (the knock code, the touch pattern and the password) are met. In this instance, the number and order of linked lock screens may be appropriately selected by the user from a menu.

In another embodiment, the present invention may individually display different lock screens according to a spaced distance between the LDAF sensor 125 and a finger. That is, as illustrated in FIG. 17B, when the user keeps touching the LDAF sensor 125 with a finger (touch & hold), the controller 180 outputs the first lock screen 70 which can be unlocked in response to the input of the knock code, and unlocks the first lock screen 70 immediately when a correct knock code is input on the first lock screen 70.

When the user takes the finger away from the LDAF sensor 125 by a first distance within a predetermined time after touching the LDAF sensor 125 with the finger, the controller 180 outputs the second lock screen 71 which can be unlocked in response to the input of the touch pattern, and unlocks the second lock screen 71 immediately when a correct touch pattern is input on the second lock screen 71.

Also, when the user takes the finger farther away from the LDAF sensor 125 by a second distance within a predetermined time after touching the LDAF sensor 125 with the finger, the controller 180 outputs the third lock screen 72 which can be unlocked in response to the input of the password, and unlocks the third lock screen 72 immediately when a correct password is input on the third lock screen 72. In this embodiment, the user can select the first, second and third lock screens corresponding to the spaced distances, respectively, from a menu.

Figure 18:
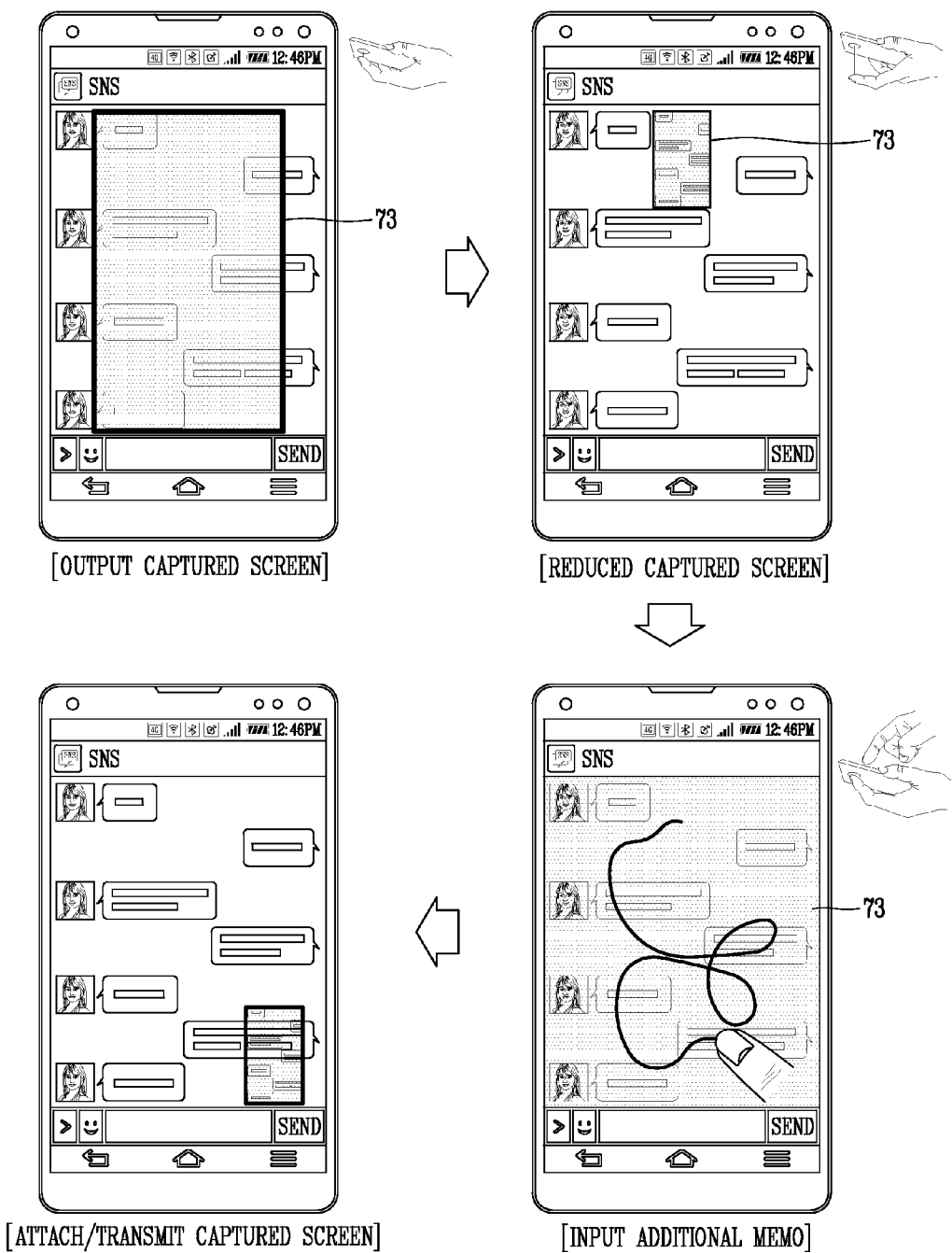
FIG. 18 is a view illustrating an embodiment of performing a captured screen paste (or attachment) using an LDAF sensor.

FIG. 18 is a view illustrating an embodiment of performing a captured screen paste (or attachment) using an LDAF sensor. When a user taps ("knock knock") the rear LDAF sensor 125, the controller 180 captures a currently-output screen on the front display unit 151. When the user holds the finger at a first distance from the rear LDAF sensor 125, the controller 180 maintains the captured screen 73. Under this state, when the user takes the finger farther away from the rear LDAF sensor 125 by a second distance, the controller 180 reduces the captured screen 73 at a predetermined magnification, and outputs the reduced screen at one side of the display unit 151. Here, the reduction magnification of the captured screen 73 is proportional to the spaced distance.

Afterwards, when the user retouches the rear LDAF sensor 125 with the finger, the controller 180 outputs the captured screen 73 in the form of a screen shot such that the user can input an additional memo on the screen shot. In response to the complete input of the additional memo, the controller 180 attaches the captured screen 73 on a current screen. Accordingly, the user can select a send button and send the screen with the captured screen attached thereto.

In general, when a second application is additionally run while a first application is output on a screen, the more recently-executed second application is output on an upper layer. This may allow the user to perform multi-tasking for the first and second applications. Therefore, the present invention may provide a method of performing multi-tasking using different applications when the different applications are displayed in a hierarchical manner.

Figure 19:
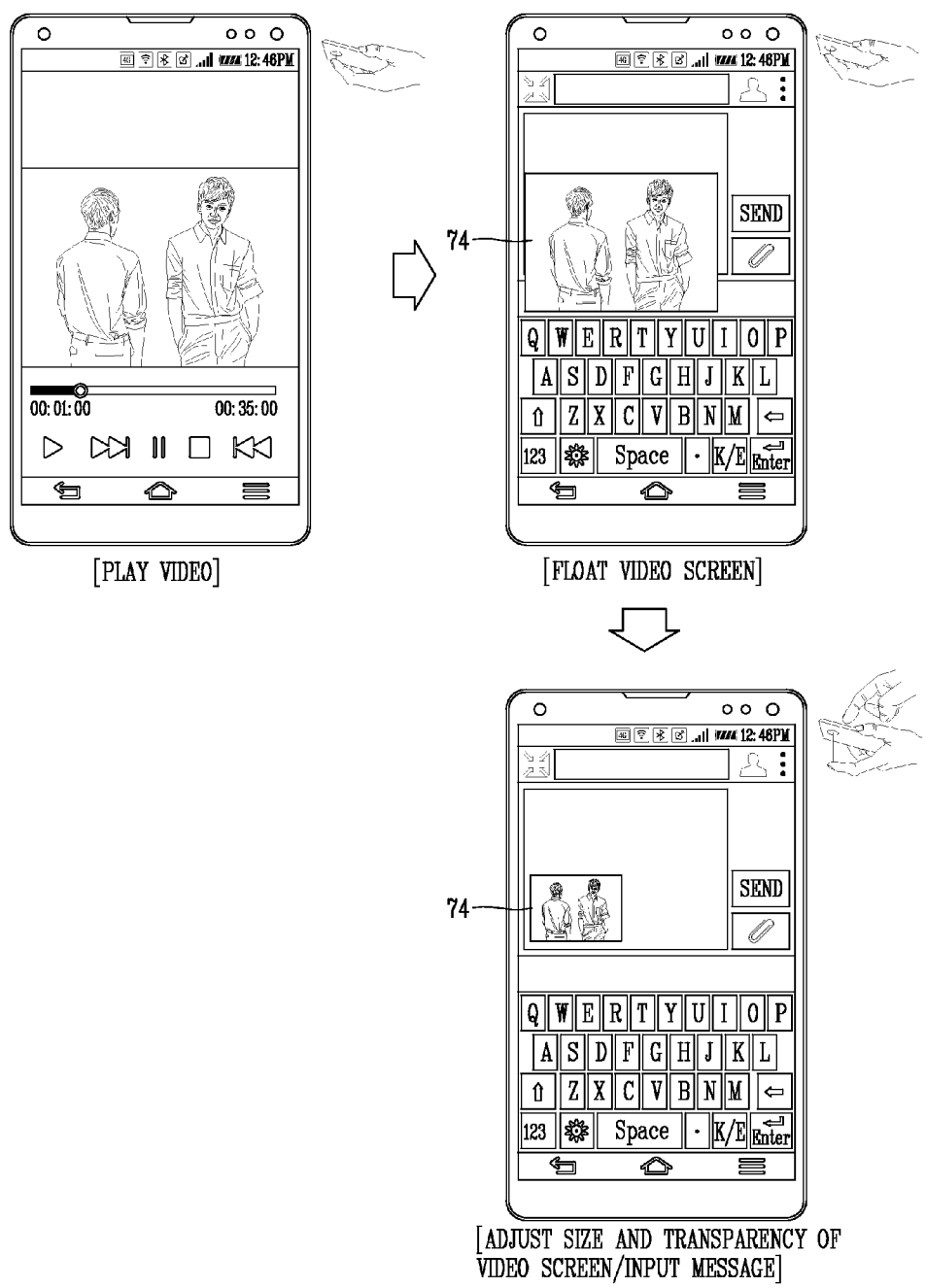
FIG. 19 is a view illustrating an embodiment of controlling multi-tasking using an LDAF sensor.

FIG. 19 is a view illustrating an embodiment of controlling multi-tasking using an LDAF sensor. When the user plays (reproduces) a video 74 while a message writing screen 75 is output, the controller 180 plays the video 74 on the message writing screen 75. That is, the message writing screen 75 is displayed on a lower layer and the video 74 is currently output on an upper layer.

Under this state, after touching the LDAF sensor with a finger, when the user spaces the finger from the LDAF sensor by a predetermined distance and holds the finger at the predetermined distance (e.g., hovering) from the LDAF sensor, the controller 180 floats the video screen 74 above the message writing screen 75. In this state, when the user spaces the finger away from the LDAF sensor, size and transparency of the video screen (upper layer) 74 are adjusted according to the spaced distance to enable multi-tasking. For example, the size of the floated video screen 74 is reduced and transparency thereof increases according to the spaced distance. A position of the reduced video screen 74 may be moved by a user through a touch & drag. Therefore, the user can write and send a message on the message writing screen 75 while viewing the size-reduced video 74.

In the present invention, while a plurality of applications are run at lower layers, the plurality of applications may be floated and then automatically scrolled when a finger is held at a predetermined distance from the LDAF sensor. In this instance, a selected application may be output in a full screen and the other applications may be maintained in the floated state.

In another embodiment, while a plurality of applications are run at lower layers, when a finger is held at a predetermined distance from the LDAF sensor, the plurality of applications may be divided and displayed at one side of a screen. The present invention may control scroll speed and direction of an application according to a spaced distance of a finger and a number of knocks.

Figure 20A:
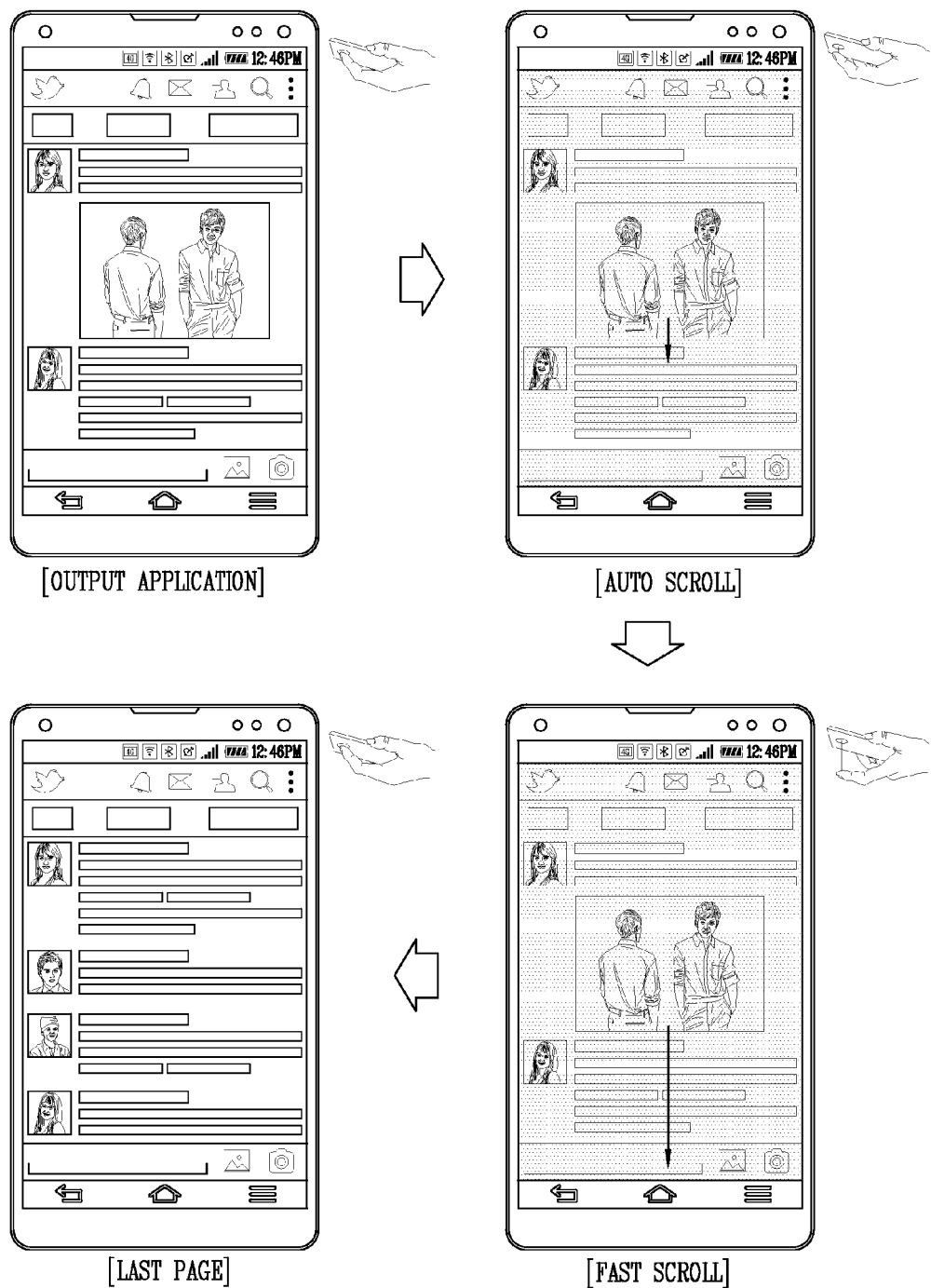
FIGS. 20A and 20B are views illustrating an embodiment of controlling scroll speed and direction using an LDAF sensor.
Figure 20B:
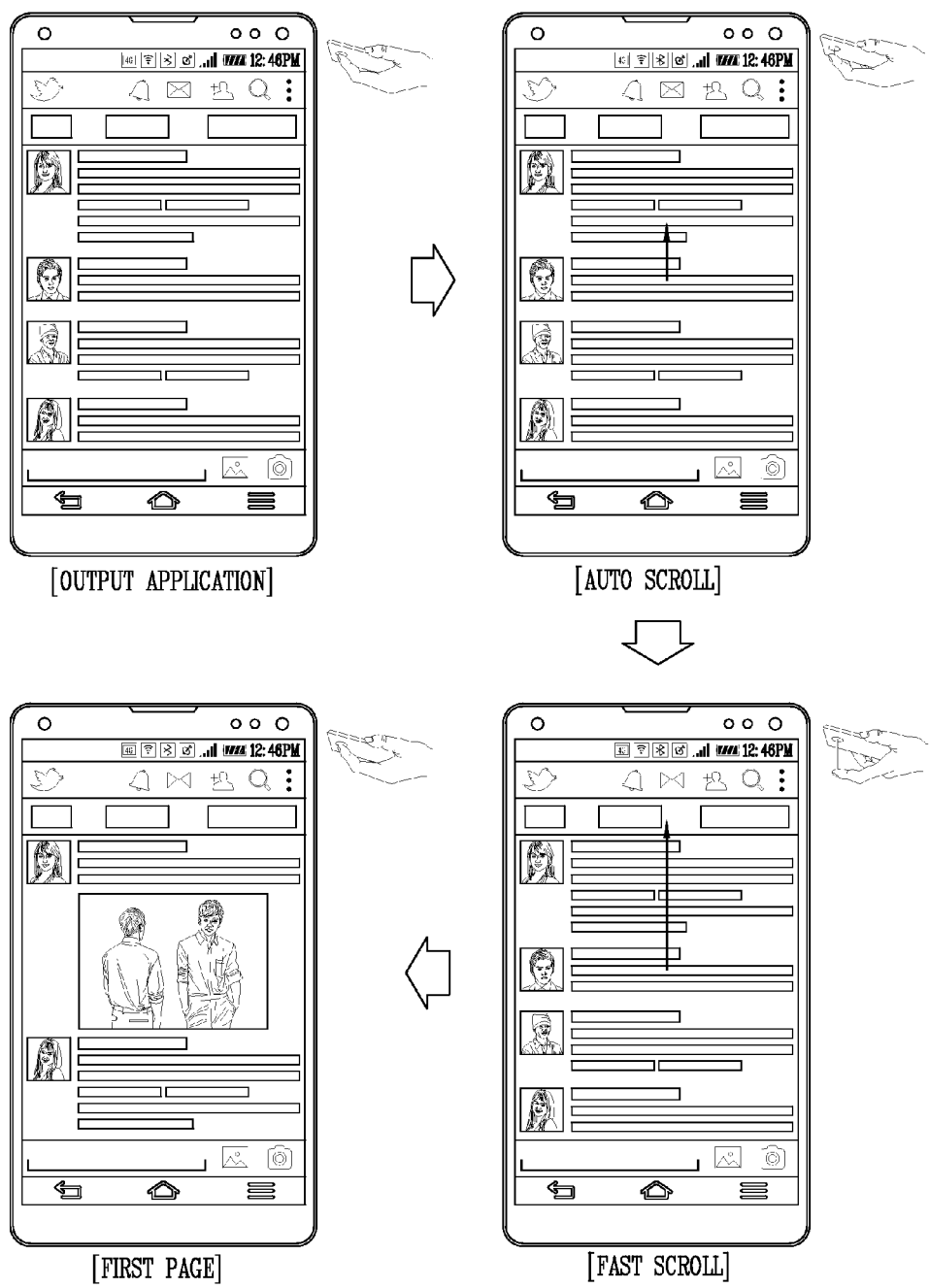

FIGS. 20A and 20B are views illustrating an embodiment of controlling scroll speed and direction using an LDAF sensor. As illustrated in FIG. 20A, while a predetermined application is output, when the user touches the LDAF sensor with a finger, spaces the finger away from the LDAF sensor and holds the finger at the spaced distance, the controller 180 automatically scrolls the currently-output application in a first direction at a predetermined speed. In this state, when the user spaces the finger farther away from the LDAF sensor, the controller 180 performs a fast scroll by controlling the scroll speed in the first direction. The first direction may be a downward direction.

While the scrolling is ongoing or the last page is output, when the user retouches the LDAF sensor with the finger, spaces the finger away from the LDAF sensor by a first distance, and holds the finger at the first distance, as illustrated in FIG. 20B, the controller 180 automatically scrolls the currently-output application in a second direction at a predetermined speed. Afterwards, when the user spaces the finger farther away from the LDAF sensor, the controller 180 performs fast scroll by controlling the scroll speed in the second direction. The second direction may be opposite to the first direction, for example, an upward direction.

As described above, the present invention can manipulate an application in an easy and convenient manner by controlling a quantity of information of an application (or content) output on a front display, a layer of an application, relation, display time and the like, according to the spaced distance between the rear LDAF sensor and the finger. Without a limit to the rear LDAF sensor, the present invention may equally perform the aforementioned operations using a distance measurement sensor or a proximity sensor disposed at the front surface.

As aforementioned, the proximity sensor 141 (FIG. 1) may detect presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

Figure 21:
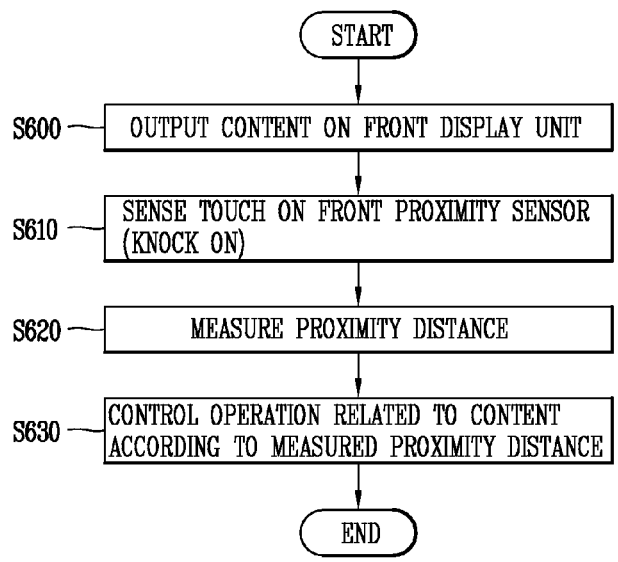
FIG. 21 is a flowchart illustrating a method of controlling content according to a spaced, distance of a finger in accordance with another embodiment of the present invention.

FIG. 21 is a flowchart illustrating a method of controlling content according to a spaced distance of a finger in accordance with another embodiment of the present invention. As illustrated in FIG. 21, a user-selected content may be displayed on the front display unit 151 (S600). The content is content (e.g., a webpage) having at least one page, a text view, an image view (e.g., photo), and an audio view. In this state, when the user knocks on the proximity sensor 141 with a finger, the proximity sensor 141 is activated (S610). The activated proximate sensor 141 measures a proximity distance of the finger suing electromagnetic force or infrared rays (S620). Therefore, the controller 180 performs a control operation for the content output on the front display unit 151 based on the proximity distance measured through the proximity sensor 141 (S630). The control operation may be relevant to editing, selecting, saving and moving the content.

Figure 22:
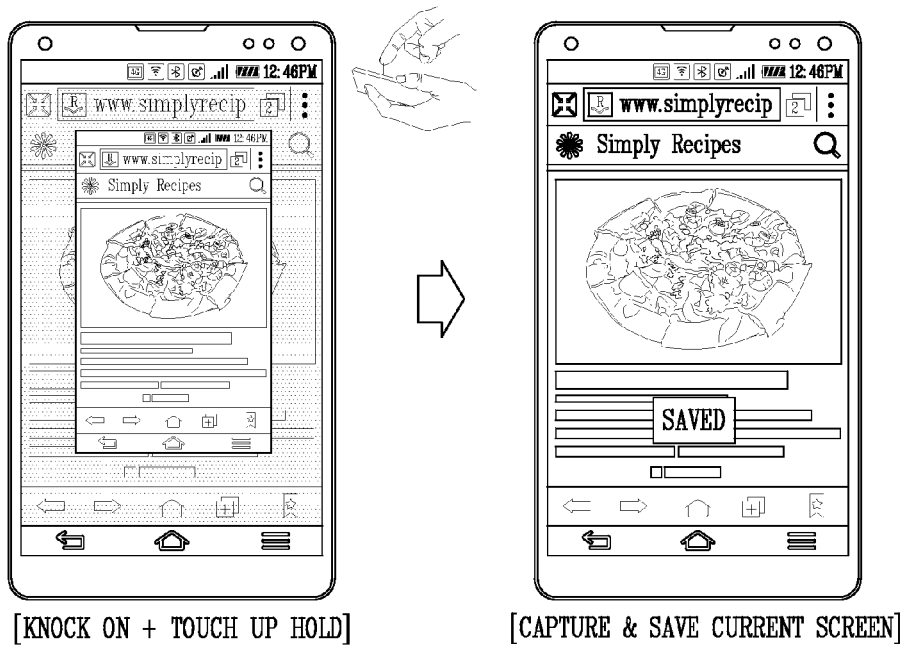
FIG. 22 is a view illustrating an embodiment of performing a default capture operation using a proximity sensor.

FIG. 22 is a view illustrating an embodiment of performing a default capture operation using a proximity sensor. As illustrated in FIG. 22, various operations for an application output on a screen may be controlled using a user's touch gesture, in more detail, an operation of tapping the screen (knockon) and a front proximity sensor for measuring a distance.

That is, when the user knocks on the proximity sensor with a finger, spaces the finger away from the proximity sensor by a predetermined distance (proximity distance) and holes the finger at the predetermined distance (KnockOn+ Touch up hold), the controller 180 can capture the application currently output on the front display unit 151 and automatically save the captured screen (captured application).

Figure 23:
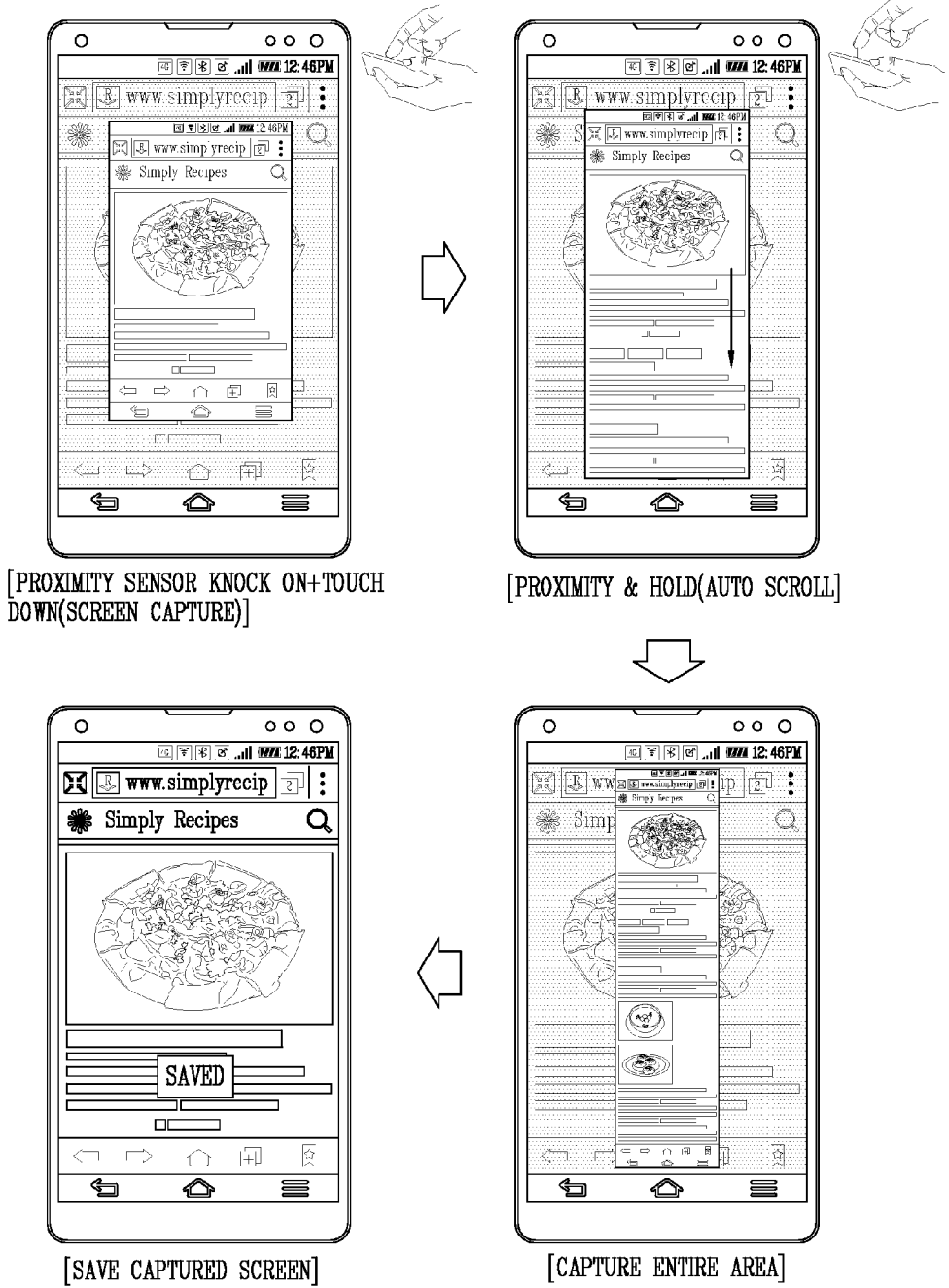
FIG. 23 is a view illustrating an embodiment of controlling an applied capture operation using a proximity sensor.

FIG. 23 is a view illustrating an embodiment of controlling an applied capture operation using a proximity sensor. As illustrated in FIG. 23, when the user knocks on ('knock knock') the front proximity sensor 141 with a finger and keeps touching the proximity sensor 141 with the finger, the controller 180 activates a capturing operation and captures an application (or content) currently output on a screen. In this state, when the user spaces the finger away from the proximity sensor 141 by a predetermined distance and holds the finger at the predetermined distance, the controller 180 scrolls down the captured screen (application) to extend a capture area.

Afterwards, when the user approaches the finger close to the proximity sensor 151, the controller 180 increases the scroll speed according to the proximity distance so as to enlarge the capture area. Then, while scrolling the screen, when the user touches the proximity sensor 141 with the finger, the controller 180 saves the currently-captured screen in the memory 170.

Figure 24:
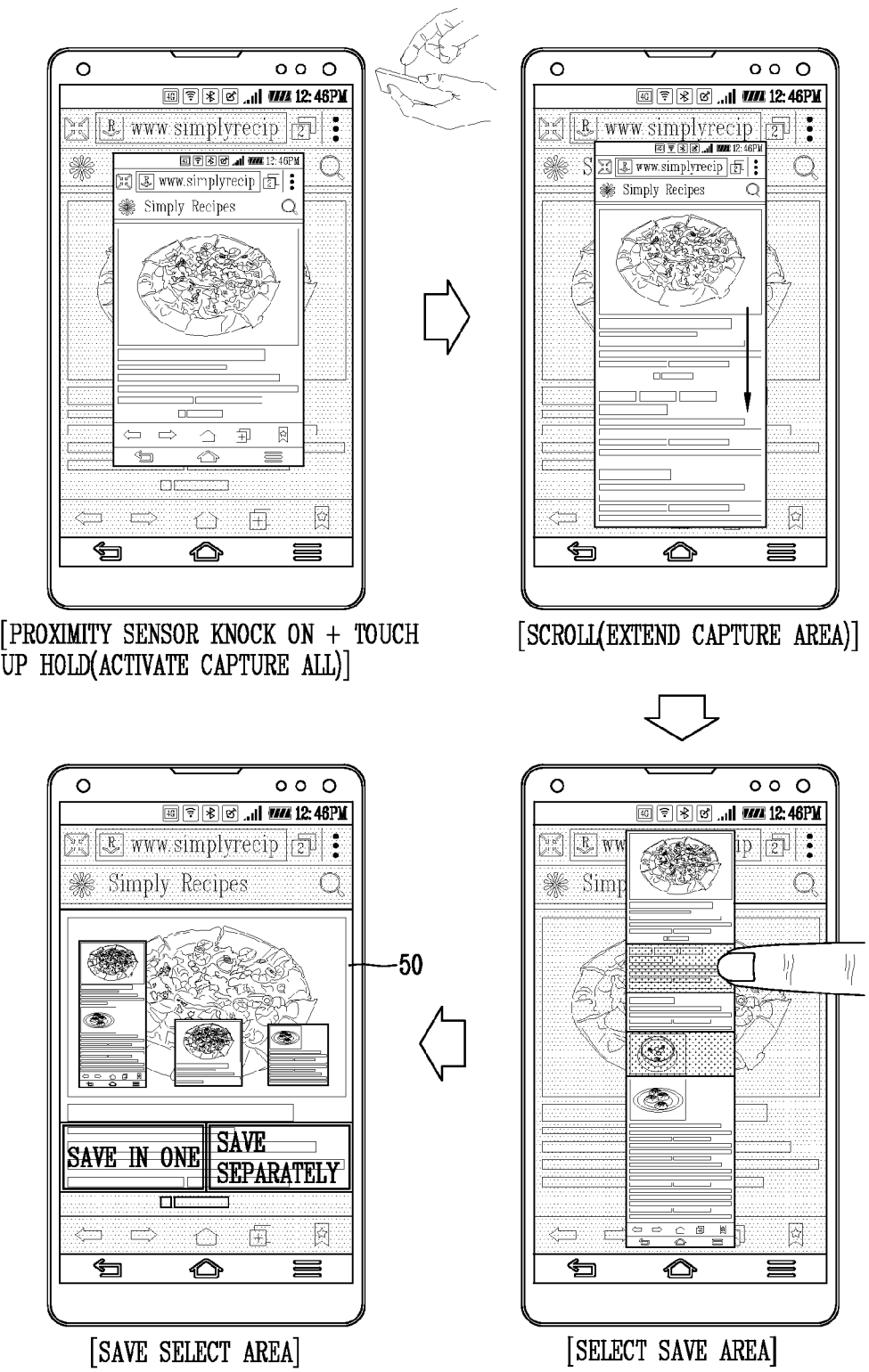
FIG. 24 is a view illustrating another embodiment of controlling an applied capture operation using a proximity sensor.

FIG. 24 is a view illustrating another embodiment of controlling an applied capture operation using a proximity sensor. As illustrated in FIG. 24, while a webpage is output on the front display unit 151, when the user knocks on (e.g., 'knock knock') the front proximity sensor 141 with a finger, spaces the finger away from the proximity sensor 141 by a predetermined distance, and holds the finger at the predetermined distance (Touch up & hold), the controller 180 activates a capture all operation and simultaneously captures the currently-output webpage to output on the front display unit 151.

When the finger is kept held, the controller 180 scrolls down the captured screen at a predetermined speed to extend a capture area. When the finger gets close to the proximity sensor 141, the controller 180 increases the scroll speed in proportion to a proximity distance of the finger, so as to output a full area of the webpage. In a front surface control state, the controller 180 can touch a text view and/or an image view included in the captured screen so as to select a save area. When the user retouches the proximity sensor 141, the controller 180 saves the full captured screen, or captures a user-selected area and saves the captured screen of the user-selected area in the memory 170. If the save area is in plurality, the controller 180 can provide a popup window 50 for the user to select 'save in one' or 'save separately.'

Figure 25:
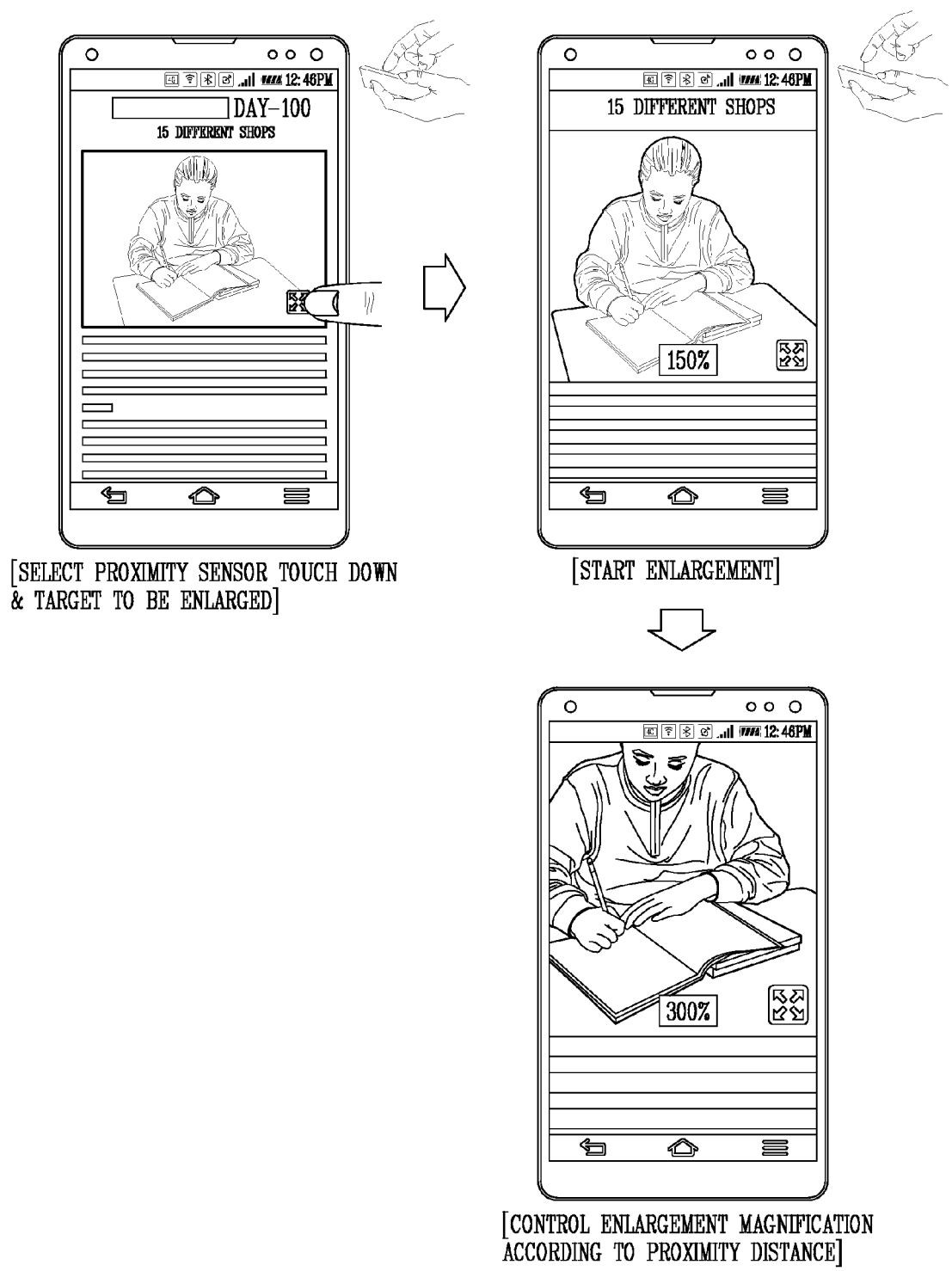
FIG. 25 is a view illustrating an embodiment of controlling a screen enlargement using a proximity sensor.

FIG. 25 is a view illustrating an embodiment of controlling a screen enlargement using a proximity sensor. After entering a magnifying glass mode, while the user touches the rear LDAF sensor 125, the user can select a target (a specific content page) to enlarge from content currently displayed on the front display unit 151 with another finger.

Under this state, when the user takes the finger away from the front proximity sensor 141, the controller 180 starts to enlarge the target, and keeps enlarging the target by controlling an enlargement magnification according to a proximity distance (spaced distance). Afterwards, when the user decreases the spaced distance again, the controller 180 reduced the enlarged screen. When the front proximity sensor 141 is touched, the controller 180 outputs an initial screen. In another embodiment, a screen may be enlarged according to a proximity distance of a forefinger while the forefinger is held at a predetermined distance after knocking on the front proximity sensor 141 with the forefinger in the magnifying glass mode.

Figure 26A:
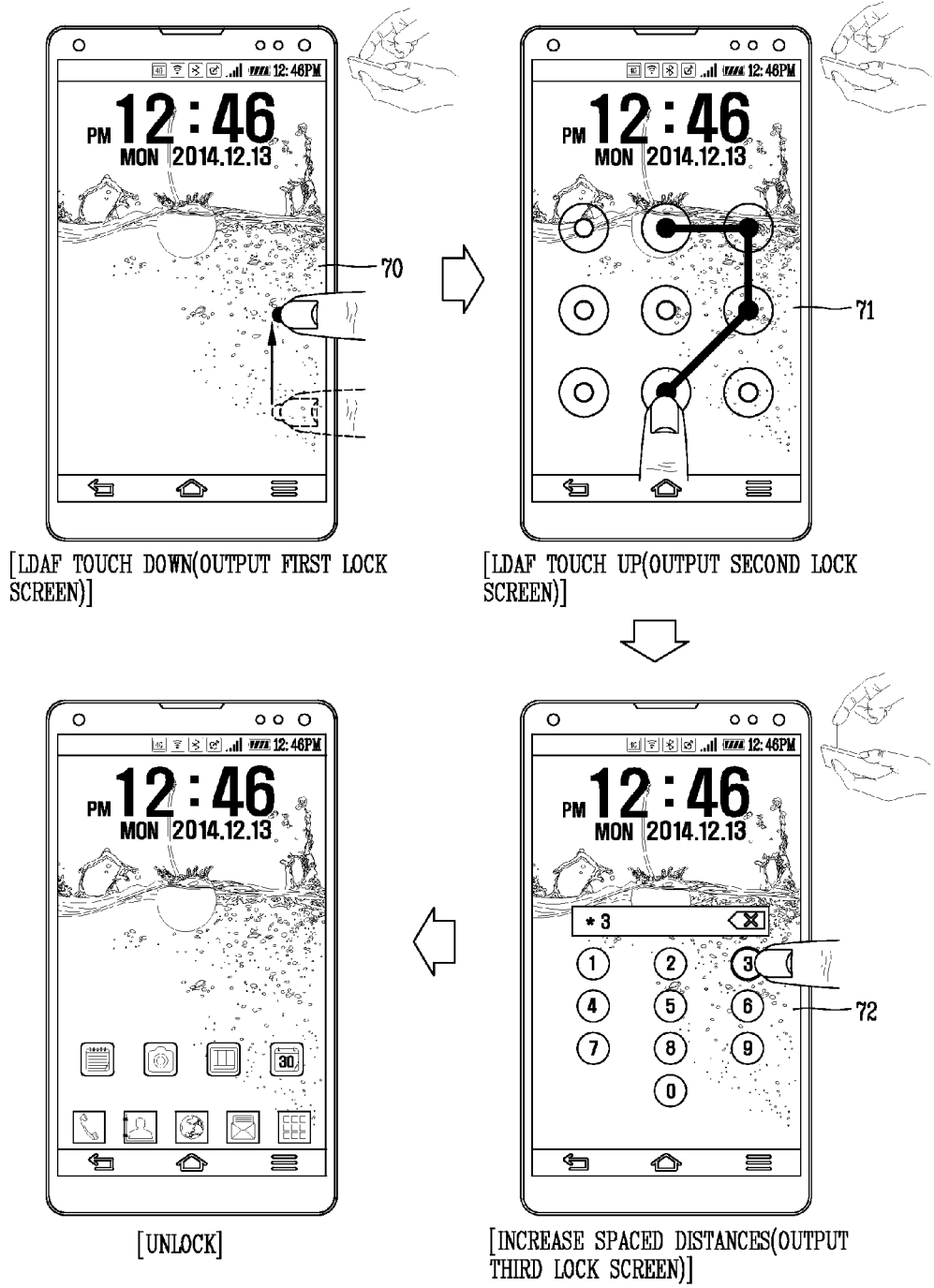
FIGS. 26A and 26B are views illustrating an embodiment of controlling different types of lock screens using a proximity sensor.
Figure 26B:
Figure 26B:
Figure 26B:
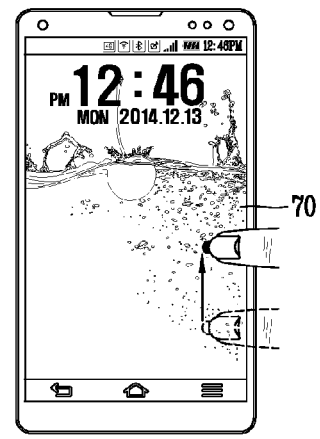
Figure 26B:
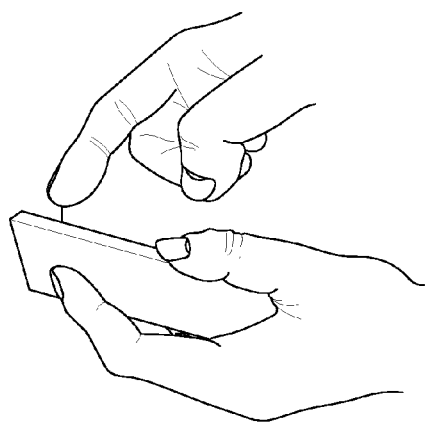
Figure 26B:
Figure 26B:
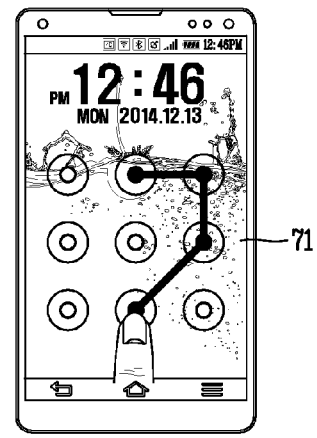
Figure 26B:
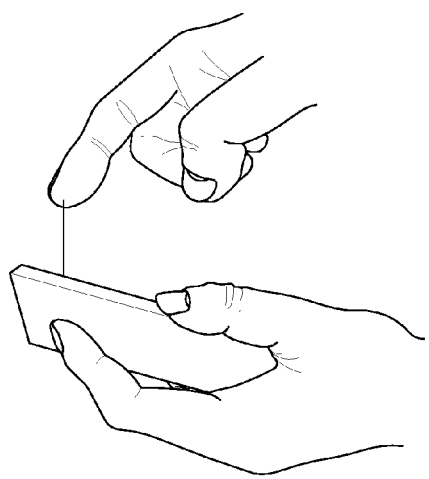
Figure 26B:
Figure 26B:
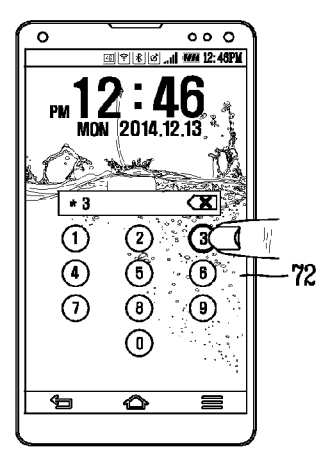

FIGS. 26A and 26B are views illustrating an embodiment of controlling different types of lock screens using a proximity sensor. As illustrated in FIG. 26A, the controller 180 can sequentially output one or more lock screens, different from one another, according to a proximity distance (spaced distance) between a proximity sensor and a finger.

In one embodiment, when the user touches the proximity sensor 141 (Touch down), the controller 180 outputs a first lock screen 70 which can be unlocked in response to an input of a knock code. The user then inputs the knock code on the first lock screen 70. When the input knock code is equal to a prestored knock code, the controller 180 checks whether or not more lock screens relating to the first lock screen 70 are present.

When no more lock screen relating to the first lock screen 70 is present according to the check result, the controller 180 unlocks the first lock screen 70 and outputs an idle screen. Further, when there is a lock screen relating to the first lock screen 70, the controller 180 waits for the next input while maintaining a lock state of the first lock screen 70.

Afterwards, when the finger which is touching the proximity sensor 141 is spaced apart from the proximity sensor 141 by a first distance, the controller 180 outputs a second lock screen 71 which can be unlocked by a touch pattern. The user then inputs the touch pattern on the second lock screen 71. When the touch pattern is equal to a prestored touch pattern, the controller 180 rechecks whether or not more lock screens relating to the second lock screen 71 are present.

When no more lock screen relating to the second lock screen 71 is present according to the check result, the controller 180 unlocks the second lock screen 71 and outputs an idle screen. Further, when there is a lock screen relating to the second lock screen 71, the controller 180 waits for the next input while maintaining a lock state of the second lock screen 71.

Afterwards, when the finger which is touching the proximity sensor 141 is spaced apart from the proximity sensor 141 by a second distance, the controller 180 outputs a third lock screen 72 which can be unlocked by a password. The user then inputs the password on the third lock screen 72. When the input password is equal to a prestored number, the controller 180 rechecks whether or not more lock screens relating to the third lock screen 72 are present.

When no lock screen relating to the third lock screen 72 is present according to the check result, the controller 180 unlocks the third lock screen 72 and outputs an idle screen. In this embodiment, the first to third lock screens are sequentially linked to one another. Thus, the user unlocks the lock screen when at least two inputs of the three types of inputs (the knock code, the touch pattern and the password) are met. In this instance, the number and order of linked lock screens may be appropriately selected by the user from a menu.

In another embodiment, the present invention may individually displays different lock screens according to a spaced distance between the proximity sensor 141 and a finger. That is, as illustrated in FIG. 26B, when the user keeps touching the proximity sensor 141 with a finger (touch & hold), the controller 180 outputs the first lock screen 70 which can be unlocked in response to the input of the knock code, and unlocks the first lock screen 70 immediately when a correct knock code is input on the first lock screen 70.

When the user takes the finger away from the proximity sensor 141 by a first distance within a predetermined time after touching the proximity sensor 141 with the finger, the controller 180 outputs the second lock screen 71 which can be unlocked in response to the input of the touch pattern, and unlocks the second lock screen 71 immediately when a correct touch pattern is input on the second lock screen 71.

Also, when the user takes the finger farther away from the proximity sensor 141 by a second distance within a predetermined time after touching the proximity sensor 141 with the finger, the controller 180 outputs the third lock screen 72 which can be unlocked in response to the input of the password, and unlocks the third lock screen 72 immediately when a correct password is input on the third lock screen 72.

In this embodiment, the user can select the first, second and third lock screens corresponding to the spaced distances, respectively, from a menu.

The present invention has exemplarily illustrated some operations using the proximity sensor for the sake of explanation. However, without limit to those examples, the present invention can equally be applied all of control operations using the rear LDAF. As described above, the present invention can perform various control operations in association with an operation of content output on a front surface according to a spaced distance between a distance measurement sensor, which is provided at a front or rear surface, and a finger. This may result in performing controls of a quantity of information of content and relation/time/depth associated with the content in an easier and more convenient manner.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling a mobile terminal, the method comprising:
    displaying content on a front display unit of the mobile terminal;
    sensing a touch gesture applied to a distance detecting sensor on a rear input unit of the mobile terminal, the distance detecting sensor being activated when the touch gesture is sensed;
    measuring, via a controller of the mobile terminal, a spaced distance of a finger, taken away from the distance detecting sensor after inputting the touch gesture; and
    controlling, via the controller, an operation of the content displayed on the front display unit based on a combination type of the sensed touch gesture and the measured spaced distance,
    wherein the controlling the operation of the content comprises:
    capturing the currently-displayed content and outputting the captured content when the combination type is a type in which the distance detecting sensor senses a Knockon & Touch down on the rear input unit;
    extending a capture area by scrolling a captured screen when the combination type is a type in which the finger is spaced from the distance detecting sensor and held;
    increasing a scroll speed according to a spaced distance when the combination type is a type in which the finger is farther spaced in the held state; and
    saving the captured screen when the combination type is a type in which the distance detecting sensor is retouched during scrolling the captured screen.

2. The method of claim 1, wherein the distance detecting sensor is a laser detection auto focus sensor provided at a center of the rear input unit located on an upper end portion of the rear side of the mobile terminal.

3. The method of claim 1, wherein the touch gesture is a knockon input tapping a screen of the rear input unit at least one time.

4. The method of claim 1, wherein the controlling the operation of the content comprises:
capturing the content and automatically saving the captured content when the distance detecting sensor senses a Knockon & Touch down push on the rear input unit.

5. The method of claim 1, further comprising:
activating a capture all function capturing the full content when the combination type is a type in which the distance detecting sensor senses a Knockon & Touch up on the rear input unit.

6. The method of claim 1, wherein the controlling the operation of the content comprises:
sensing a selection of a target to be enlarged while the distance detecting sensor is touched; and
controlling enlargement or reduction of the content in proportion to the spaced distance of the finger from the distance detecting sensor.

7. The method of claim 1, wherein the controlling the operation of the content comprises:
determining a set type of a lock screen when the distance detecting sensor senses Power up in a touched state; and
providing individual or hierarchical lock screens according to the determined type of the lock screen and the spaced distance between the distance detecting sensor and the finger.

8. The method of claim 7, wherein the providing the individual or hierarchical lock screens comprises:
individually outputting different lock screens according to the spaced distance between the distance detecting sensor and the finger when the determined type of the lock screen is a first type; and
sequentially outputting a combination of the different lock screens according to the spaced distance between the distance detecting sensor and the finger when the determined type of the lock screen is a second type.

9. The method of claim 8, wherein the different lock screens comprise:
a first lock screen for an input of a Knockon;
a second lock screen for an input of a touch pattern; and
a third lock screen for an input of a password.

10. A mobile terminal comprising:
a front display unit configured to display content;
a distance detecting sensor on a rear input unit and configured to sense a touch gesture, the distance detecting sensor being activated when the touch gesture is sensed; and
a controller configured to:
measure a spaced distance of a finger which is taken away from the distance detecting sensor after inputting the touch gesture to the distance detecting sensor, and
control an operation of the content displayed on the front display unit based on a combination type of the touch gesture and the measured spaced distance,
wherein the controller is further configured to:
capture the currently-output content and output the captured content when the combination type is a type in which the distance detecting sensor senses a Knockon & Touch down on the rear input unit,
scroll a captured screen to extend a capture area when the combination type is a type in which the finger is spaced from the distance detecting sensor and held,
increase a scroll speed according to a spaced distance when the combination type is a type in which the finger is farther spaced apart from the distance detecting sensor, and
save the captured screen when the combination type is a type in which the distance detecting sensor is retouched during scrolling of the captured screen.

11. The terminal of claim 10, wherein the distance detecting sensor is a laser detection auto focus (LDAF) sensor provided at a center of the rear input unit located on an upper end portion of the rear side of the mobile terminal, and
wherein the distance detecting sensor is provided in a central recess of the rear input unit, and activated in response to an input of the touch gesture.

12. The terminal of claim 10, wherein the touch gesture is a Knockon input tapping a screen on the rear input unit at least one time.

13. The terminal of claim 10, wherein the controller is further configured to capture the content and automatically save the captured content when the distance detecting sensor senses a Knockon & Touch down push.

14. The terminal of claim 10, wherein the controller is further configured to activate a capture all function capturing the full content when the combination type is a type in which the distance detecting sensor senses a Knockon & Touch up on the rear input unit.

15. The terminal of claim 10, wherein the controller is further configured to:
sense a selection of a target to be enlarged while the distance detecting sensor is touched, and
control enlargement or reduction of the content in proportion to the spaced distance of the finger from the distance detecting sensor.

16. The terminal of claim 10, wherein the controller is further configured to:
determine a set type of a user-set lock screen when the distance detecting sensor senses Power up in a touched state, and
provide individual or hierarchical lock screens according to the determined type of the lock screen and the spaced distance between the distance detecting sensor and the finger.

17. The terminal of claim 16, wherein the controller is further configured to:
individually output different lock screens according to the spaced distance between the distance detecting sensor and the finger when the determined type of the lock screen is a first type, and
sequentially output a combination of the different lock screens according to the spaced distance between the distance detecting sensor and the finger when the determined type of the lock screen is a second type.

18. The terminal of claim 17, wherein the different lock screens comprise:
a first lock screen for an input of a Knockon;
a second lock screen for an input of a touch pattern; and
a third lock screen for an input of a password.

* * * * *